(12) United States Patent
Kodama et al.

(10) Patent No.: US 8,392,087 B2
(45) Date of Patent: Mar. 5, 2013

(54) VEHICLE CONTROL SYSTEM

(75) Inventors: Hiroyuki Kodama, Kariya (JP); Masayoshi Takeda, Kariya (JP); Yasuhiro Nakai, Kariya (JP)

(73) Assignee: Advics Co., Ltd, Kariya, Aichi-Pref (JP)

( * ) Notice: Subject to any disclaimer, the term of this patent is extended or adjusted under 35 U.S.C. 154(b) by 948 days.

(21) Appl. No.: 12/198,415

(22) Filed: Aug. 26, 2008

(65) Prior Publication Data

US 2009/0063000 A1    Mar. 5, 2009

(30) Foreign Application Priority Data

Aug. 28, 2007 (JP) ................................ 2007-221143

(51) Int. Cl.
*G06F 17/00* (2006.01)

(52) U.S. Cl. ............... 701/75; 701/80; 701/87; 477/107; 702/154

(58) Field of Classification Search .................... 701/75, 701/94, 80, 87; 477/203, 107; 702/154; *G06F 17/00*
See application file for complete search history.

(56) References Cited

U.S. PATENT DOCUMENTS

| | | | |
|---|---|---|---|
| 4,850,656 A | | 7/1989 | Ise et al. |
| 5,832,400 A | * | 11/1998 | Takahashi et al. ............... 701/53 |
| 6,106,434 A | * | 8/2000 | Ibamoto et al. ................ 477/120 |
| 6,264,292 B1 | * | 7/2001 | Umeno et al. ................. 303/196 |
| 6,510,374 B1 | * | 1/2003 | Saotome et al. ................. 701/80 |
| 6,604,595 B2 | * | 8/2003 | Sakakiyama ................. 180/233 |
| 6,644,454 B2 | * | 11/2003 | Yamada et al. ............ 192/219.1 |
| 7,027,904 B2 | * | 4/2006 | Ishizu et al. .................... 701/93 |
| 7,996,139 B2 | | 8/2011 | Okuda et al. |
| 2001/0008989 A1 | * | 7/2001 | Minowa et al. ................. 701/96 |
| 2001/0033106 A1 | * | 10/2001 | Shirai et al. .................... 303/177 |
| 2002/0059826 A1 | * | 5/2002 | Ono et al. ..................... 73/146.5 |
| 2003/0033071 A1 | * | 2/2003 | Kawasaki ....................... 701/80 |

FOREIGN PATENT DOCUMENTS

| | | |
|---|---|---|
| JP | 63-222964 A | 9/1988 |
| JP | 3-103660 A | 4/1991 |
| JP | 5-286380 A | 11/1993 |
| JP | 2002-211377 A | 7/2002 |
| JP | 2005-051886 A | 2/2005 |
| JP | 2007-009894 A | 1/2007 |

OTHER PUBLICATIONS

Rajamani, R., Piyabongkarn, D., Lew, J.Y., Grogg, J.A, "Algorithms for real-time estimation of individual wheel tire-road friction coefficients", American Control Conference, 2006, Digital Object Identifier: 10.1109/ACC.2006.1657460, Publication Year: 2006.*

(Continued)

*Primary Examiner* — Tuan C. To
(74) *Attorney, Agent, or Firm* — Buchanan Ingersoll & Rooney PC

(57) ABSTRACT

When a vehicle is started on an uphill road, slip may easily occur between vehicle wheels and a sloping road surface. When vehicle condition is changed from its stopping condition to its traveling condition on the uphill road, vehicle acceleration is controlled in a feed-back operation in such a manner that a target acceleration is made smaller as road gradient becomes larger or coefficient of friction becomes smaller.

22 Claims, 16 Drawing Sheets

OTHER PUBLICATIONS

Mangan, S., Jihong Wang, "Development of a Novel Sensorless Longitudinal Road Gradient Estimation Method Based on Vehicle Can Bus Data", Mechatronics, IEEE/ASME Transactions on, vol. 12, Issue: 3, Publication Year: 2007, pp. 375-386.*

Japanese Office Action dated Nov. 15, 2011 issued in the corresponding Japanese Patent Application No. 2007-221143 and English-language translation.

* cited by examiner

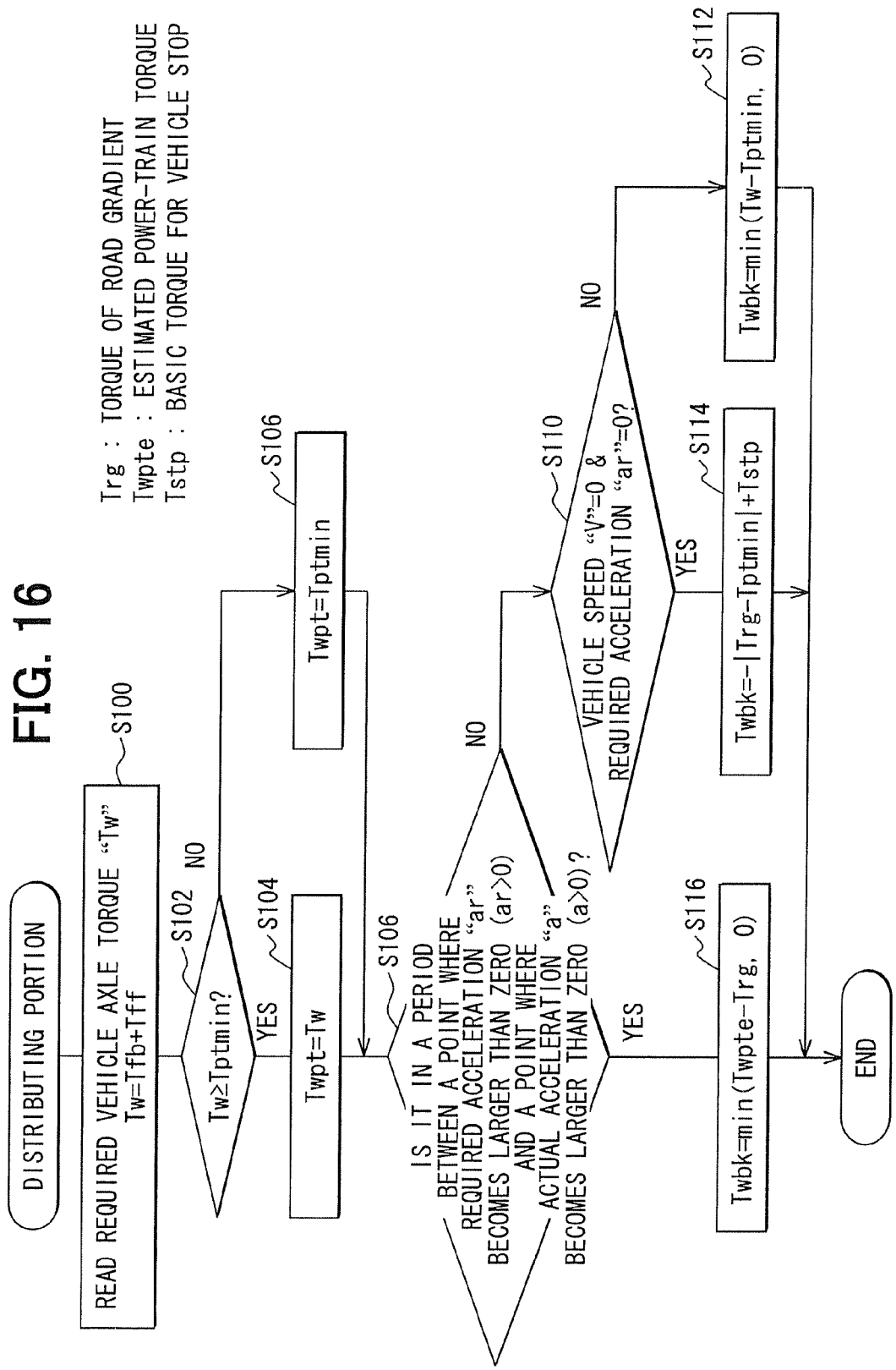

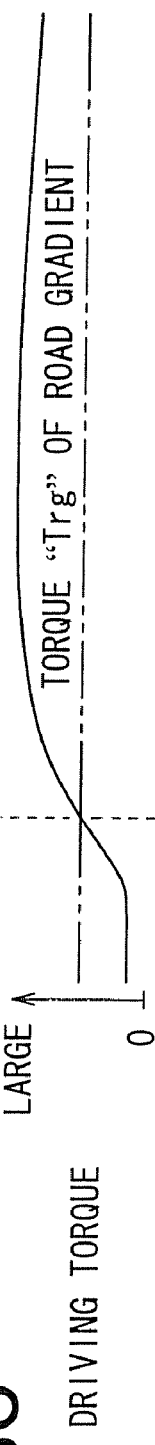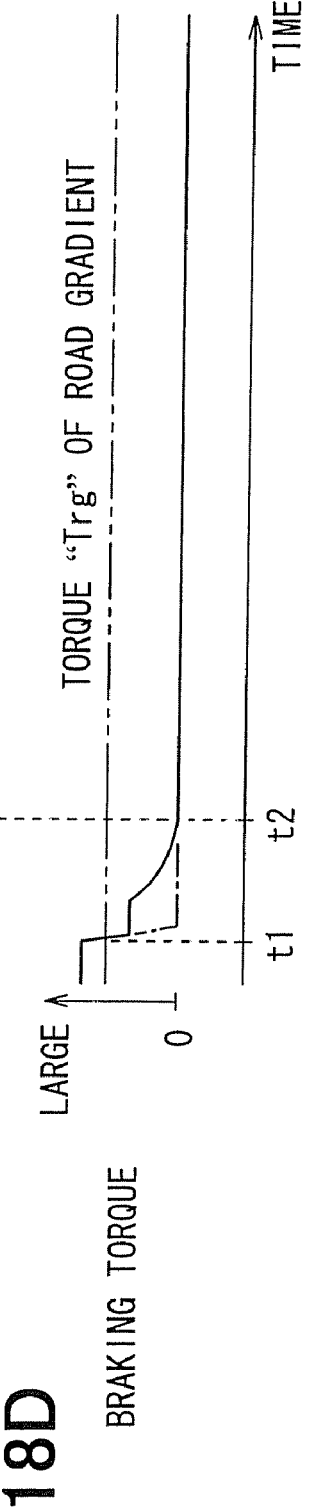
FIG. 18A VEHICLE SPEED
FIG. 18B ACTUAL ACCELERATION
FIG. 18C DRIVING TORQUE
FIG. 18D BRAKING TORQUE

VEHICLE CONTROL SYSTEM

CROSS REFERENCE TO RELATED APPLICATION

This application is based on Japanese Patent Application No. 2007-221143 filed on Aug. 28, 2007, the disclosure of which is incorporated herein by reference.

FIELD OF THE INVENTION

The present invention relates to a vehicle control system having a function for automatically controlling torque generated at a driving power generating apparatus when a vehicle is changed from its stopping condition to traveling condition.

BACKGROUND OF THE INVENTION

As a vehicle control system of this kind, it is proposed in Japanese Patent Publication No. 2005-51886, for example, that a torque to be applied by an electric motor to vehicle driving wheels is set, based on a value which is calculated by multiplying a counterbalancing torque to a force of gravitation in a vehicle backward direction by a reflection ratio, or based on a required torque corresponding to an acceleration pedal stroke operated by a vehicle driver, whichever is larger. The reflection ratio is set to become larger, as a rotational speed of the electric motor in a reverse direction is higher. According to such a vehicle control system, the torque generated at the electric motor is increased, when the vehicle driver stops its braking operation (brake-off) in the case that the vehicle is on an uphill slope, and when the vehicle is about to move in the backward direction.

According to the above vehicle control system, however, since the torque applied to the driving wheels shortly after the brake-off is smaller than the force of gravitation in the vehicle backward direction, the vehicle may be moved in the backward direction. In this situation, when the acceleration pedal is operated by the vehicle driver, the torque corresponding to such acceleration pedal stroke is applied to the driving wheels. In the case that the above torque is excessively large, the driving wheels may slip against a road surface. In particular, when the road surface is frozen, the vehicle may be largely moved in the backward direction due to such a vehicle slip. Furthermore, when the slip occurs, the ice will be molten to thereby decrease coefficient of friction between the driving wheels and the road surface. It may happen that start of vehicle movement will become impossible after occurrence of such vehicle slip.

SUMMARY OF THE INVENTION

The present invention is, therefore, made in view of the foregoing problem, and has an object to provide a vehicle control apparatus and/or a vehicle control system, according to which the vehicle is smoothly changed from its stopping condition to traveling condition, irrespectively of road surface condition.

According to a feature of the present invention, a vehicle control system has an information obtaining means for obtaining road information around a vehicle, and an automatic vehicle traveling means for operating a power generating means mounted in the vehicle based on the road information in order to bring the vehicle from vehicle stopping condition to vehicle traveling condition, when a demand for changing the vehicle condition from the stopping condition to the traveling condition is generated.

According to the above feature, the road information around the vehicle is obtained, so that a torque to be generated by the power generating means and necessary for changing the vehicle condition to the vehicle traveling condition can be appropriately grasped. The power generating means is operated based on such grasped torque in order to prevent vehicle wheels from slipping and the vehicle from moving in an opposite direction to a vehicle traveling direction. As above, the power generating means is controlled to automatically change the vehicle condition to the vehicle traveling condition, without causing the wheel slips or vehicle backward movement. In particular, an operation for automatically changing the vehicle condition to the vehicle traveling condition makes it possible to carry out fine adjustment for the torque generated by the power generating means, which is generally difficult by operating an acceleration pedal by a vehicle driver. Accordingly, the vehicle can be properly changed to the vehicle traveling condition.

The vehicle traveling condition means a condition in which a vehicle is traveling in a direction required by the vehicle driver when the vehicle is required to change to the vehicle traveling condition.

According to another feature of the present invention, the automatic vehicle traveling means automatically changes the vehicle condition from the stopping condition to the traveling condition, wherein the automatic vehicle traveling means limits torque generated by the power generating means to such a range, in which slip may not occur at vehicle wheels, based on the road information.

A range, in which vehicle wheels may not slip due to the torque generated by the power generating means, depends on the road condition around the vehicle. Therefore, according to the above feature of the invention, the power generating means is controlled based on the road condition, in such a manner that the torque is limited to such a range in which slips may not occur. Any inconvenience, which may occur due to vehicle wheel slips, can be avoided.

According to a further feature of the present invention, the road information includes information relating to a road gradient around the vehicle. Then, the automatic vehicle traveling means makes vehicle acceleration smaller as the road gradient becomes larger during an operation for changing the vehicle condition to the vehicle traveling condition, when the vehicle is on a sloping road and the vehicle is traveling in a direction opposite to a direction of a force of gravity applied to the vehicle.

In some cases, the vehicle traveling direction becomes opposite to a direction of a force of gravity applied to the vehicle, in other words, a component of the force of gravity applied to the vehicle in the direction opposite to the vehicle traveling direction is not zero, as a result that the vehicle is traveling on the sloping road. In such cases, a force applied by the vehicle to a road surface in a direction perpendicular to the road surface becomes smaller. A frictional force between the vehicle wheels and the road surface becomes smaller. In particular, the frictional force becomes smaller, as the road gradient becomes larger. Accordingly, the vehicle wheel slip may be more likely to occur even at a smaller vehicle acceleration, as the road gradient becomes larger. According to the present invention, therefore, the vehicle acceleration is controlled to become smaller as the road gradient becomes larger, in order to properly avoid the vehicle wheel slips during the operation for changing the vehicle condition to the vehicle traveling condition.

According to a still further feature of the invention, the road information includes information relating to a friction between vehicle wheels and the road surface around the vehicle. Then, the automatic vehicle traveling means makes vehicle acceleration smaller, as frictional force between the vehicle wheels and the road surface becomes smaller during the operation for changing the vehicle condition to the vehicle traveling condition.

The vehicle wheel slips are more likely to occur even at a smaller vehicle acceleration, when the frictional force between the vehicle wheels and the road surface becomes smaller. Accordingly, the vehicle acceleration is controlled to become smaller during the operation for changing the vehicle condition to the vehicle traveling condition, as the frictional force between the vehicle wheels and the road surface becomes smaller, in order to avoid the vehicle wheel slips.

According to a still further feature of the invention, the road information includes information relating to a road gradient around the vehicle. Then, the automatic vehicle traveling means makes torque to be generated by the power generating means and applied to the vehicle driving wheels smaller, as the road gradient becomes larger during the operation for changing the vehicle condition to the vehicle traveling condition, when the vehicle is on the sloping road and the vehicle is traveling in the direction opposite to the direction of the force of gravity applied to the vehicle.

As explained above, in some cases, the vehicle traveling direction becomes opposite to the direction of the force of gravity applied to the vehicle, in other words, the component of the force of gravity applied to the vehicle in the direction opposite to the vehicle traveling direction is not zero, as a result that the vehicle is traveling on the sloping road. In such cases, the force applied by the vehicle to the road surface in the direction perpendicular to the road surface becomes smaller. The frictional force between the vehicle wheels and the road surface becomes smaller. In particular, the frictional force becomes smaller, as the road gradient becomes larger. Accordingly, the vehicle wheel slip may be more likely to occur even when the torque applied to the vehicle driving wheels is smaller, as the road gradient becomes larger. According to the present invention, therefore, the torque applied to the vehicle driving wheels is controlled to become smaller as the road gradient becomes larger, in order to properly avoid the vehicle wheel slips during the operation for changing the vehicle condition to the vehicle traveling condition.

According to a still further feature of the invention, the road information includes information relating to the friction between vehicle wheels and road surface around the vehicle. Then, the automatic vehicle traveling means makes torque to be generated by the power generating means and applied to the vehicle driving wheels smaller, as the frictional force between the vehicle wheels and the road surface becomes smaller during the operation for changing the vehicle condition to the vehicle traveling condition.

The vehicle wheel slips are more likely to occur even when the torque applied to the vehicle driving wheels is smaller, as the frictional force between the vehicle wheels and the road surface becomes smaller. Accordingly, the torque applied to the vehicle driving wheels is controlled to become smaller during the operation for changing the vehicle condition to the vehicle traveling condition, as the frictional force between the vehicle wheels and the road surface becomes smaller, in order to avoid the vehicle wheel slips.

According to a still further feature of the invention, the automatic vehicle traveling means has an upper limit setting portion for setting an upper limit for vehicle acceleration based on the road information, and an acceleration control portion for controlling actual vehicle acceleration to be lower than the upper limit.

According to the above feature, the upper limit setting portion sets the upper limit for vehicle acceleration, within which the vehicle wheel slip may not occur. As a result, the vehicle wheel slips can be avoided during the operation for changing the vehicle condition to the vehicle traveling condition.

According to a still further feature of the invention, the acceleration control portion has an acceleration setting portion for setting a target acceleration, which is lower than the upper limit, and an operating portion for operating the power generating means so that the actual vehicle acceleration is controlled at the target acceleration.

According to the above feature, the vehicle acceleration can be controlled at a proper amount, with which the vehicle condition is properly changed from the vehicle stopping condition to the vehicle traveling condition, as a result that the target acceleration is properly set.

According to a still further feature of the invention, the acceleration setting portion sets the target acceleration based on the vehicle speed.

When the vehicle acceleration is excessively small in the case that the vehicle condition is changed from the vehicle stopping condition to the vehicle traveling condition, an increase of the vehicle speed may be excessively delayed. In such a case, the vehicle condition can not properly changed to the vehicle traveling condition. On the other hand, when the vehicle acceleration is excessively large, the vehicle speed may become too high or unpleasant feeling may be given to the vehicle driver. According to the present invention, however, the target acceleration is set based on the vehicle speed, to properly change the vehicle speed.

According to a still further feature of the invention, the acceleration setting portion sets the target acceleration at a smaller value, as the vehicle speed becomes larger.

As a result that the target acceleration is controlled to become smaller as the vehicle speed is larger, it is possible to avoid that the vehicle speed may become too high, or the vehicle speed may remain at an excessively smaller value.

According to a still further feature of the invention, the acceleration setting portion sets the target acceleration as a negative figure, when the vehicle speed becomes larger than a predetermined speed.

According to the above feature, it is possible to avoid such a case that the vehicle speed may largely exceed the predetermined speed. The predetermined speed is set as such a value lower than an upper limit value, within which the vehicle driver may not get any unpleasant feeling during the operation for changing the vehicle condition to the vehicle traveling condition. As a result, a number of braking operation by the vehicle driver (a stepping operation by the vehicle driver for a brake pedal) can be reduced during the operation for changing the vehicle condition to the vehicle traveling condition.

According to a still further feature of the invention, the automatic vehicle traveling means automatically changes the vehicle condition from the vehicle stopping condition to the vehicle traveling condition, in the case the automatic vehicle traveling means determines based on the road information that the vehicle traveling direction is opposite to the direction of the force of gravity.

In the case that the vehicle traveling direction is opposite to the direction of the force of gravity, the vehicle may be unintentionally moved in the direction opposite to the vehicle traveling direction. When the vehicle driver operates an acceleration pedal in order to avoid such unintentional vehicle movement, and when such acceleration operation is too large, the vehicle wheel slip may easily occur. Accordingly, it is desired to carry out the fine adjustment for operating the power generating means (including the engine and the transmission apparatus) during the operation for changing the vehicle condition to the vehicle traveling condition, in particular when the vehicle traveling direction is opposite to the direction of the force of gravity. Therefore, it is advantageous to automatically change the vehicle condition from the vehicle stopping condition to the vehicle traveling condition, when the vehicle traveling direction is opposite to the direction of the force of gravity.

According to a still further feature of the invention, the automatic vehicle traveling means operates the power generating means and a vehicle braking device, in such a manner that resultant force of an impelling force generated by the power generating means and applied to the vehicle in the vehicle traveling direction and a braking force generated by the vehicle braking device and applied to the vehicle becomes larger than a component of the force of gravity applied to the vehicle in the direction opposite to the vehicle traveling direction. The above operation is carried out by the automatic vehicle traveling means when the automatic vehicle traveling means determines that the vehicle traveling direction is opposite to the direction of the force of gravity, and the above operation is carried out by the automatic vehicle traveling means until the vehicle condition is changed to the vehicle traveling condition.

The resultant force of the impelling force generated by the power generating means and the braking force generated by the vehicle braking device must be directed to the vehicle traveling direction, at least until the vehicle condition has reached its vehicle traveling condition. For that purpose, the resultant force is made larger than the component of the force of gravity in the direction opposite to the vehicle traveling direction. Accordingly, it is avoided that the vehicle may be moved in the opposite direction to the vehicle traveling direction.

BRIEF DESCRIPTION OF THE DRAWINGS

The above and other objects, features and advantages of the present invention will become more apparent from the following detailed description made with reference to the accompanying drawings. In the drawings:

FIG. 16 is a flow-chart showing a process of a distributing portion of the control portion for the vehicle longitudinal direction;

FIGS. 18A to 18D are time charts showing operational modes for vehicle start control on the uphill slope according to the embodiment.

DETAILED DESCRIPTION OF THE PREFERRED EMBODIMENTS

First Embodiment

A vehicle control system according to a first embodiment of the present invention will be hereinafter explained with reference to the drawings.

Figure 1:
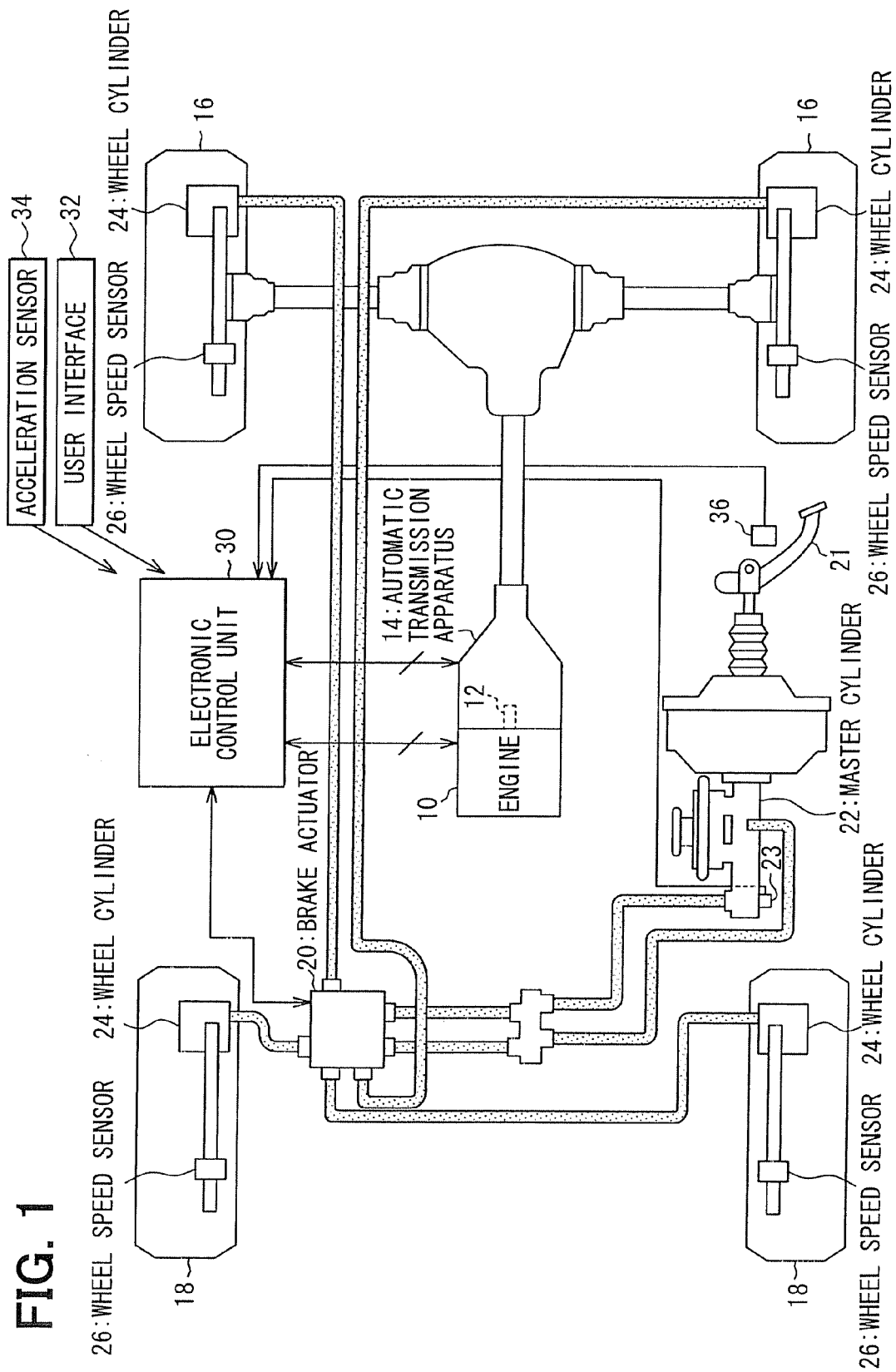
FIG. 1 is a schematic view showing an entire structure for a vehicle control system according to an embodiment of the present invention.

FIG. 1 shows an entire structure for the vehicle control system according to the embodiment.

An automatic transmission apparatus 14 is connected to a crank shaft 12 of an engine 10 (an internal combustion gasoline engine). A rotational force of the crank shaft 12 of the engine 10 is transmitted to driving wheels 16, wherein rotational speed is changed by the automatic transmission apparatus 14.

Braking force will be applied to the driving wheels 16 and driven wheels 18 by a hydraulic brake actuator 20. The hydraulic brake actuator 20 controls pressure of working fluid applied to respective wheel cylinders 24 for the respective wheels (the driving wheels 16 and the driven wheels 18), in order to respectively adjust the braking force. The hydraulic brake actuator 20 has a function for adjusting the braking force to be generated at the respective wheel cylinders 24 in accordance with pressure of a master cylinder 22, the pressure of the working fluid of which is controlled by a pedal operation of a brake pedal 21. Namely, according to the embodiment, the pressure of the working fluid in the wheel cylinders 24 is not only mechanically controlled by the operation of the brake pedal 21, but also electronically controlled by the brake actuator 20. An oil pressure sensor 23 is provided at the master cylinder 22 to detect inside pressure thereof.

Wheel speed sensors 26 are provided in each of the driving and driven wheels 16 and 18, in order to detect rotational speed of the respective wheels (wheel speed).

A vehicle is a controlled object according to the vehicle control system, wherein an electronic control unit 30 controls the engine 10, the automatic transmission apparatus 14, the brake actuator 20, and so on. More exactly, the electronic control unit 30 takes in not only detected signals of various sensors for detecting operating condition of the engine 10 and the automatic transmission apparatus, but also output signals from the oil pressure sensor 23, the wheel speed sensors 26, a user interface 32, an acceleration sensor 34, and a brake sensor 36, so as to carry out a vehicle travel control in accordance with such taken-in signals.

The user interface 32 has a switch for an automatic vehicle travel control, by which a vehicle driver outputs a command for the vehicle automatic travel. The user interface 32 further has an acceleration control device, with which the vehicle driver outputs a command for increasing torque to the engine 10. Furthermore, the user interface 32 has a direction indicating device (such as a shift lever) for indicating a vehicle traveling direction.

The acceleration sensor 34 is a sensor for detecting acceleration by detecting force applied to itself. For example, the acceleration sensor 34 is made of a pendulum type, a strain-gage type and so on. The brake sensor 36 is a sensor for detecting a pedal stroke of the brake pedal 21.

The electronic control unit 30, for example, controls actual vehicle acceleration to become a target value (a target acceleration), when command signal for the automatic vehicle travel control is inputted by the vehicle driver via the user interface 32. More detailed explanation will be made below.

Figure 2:
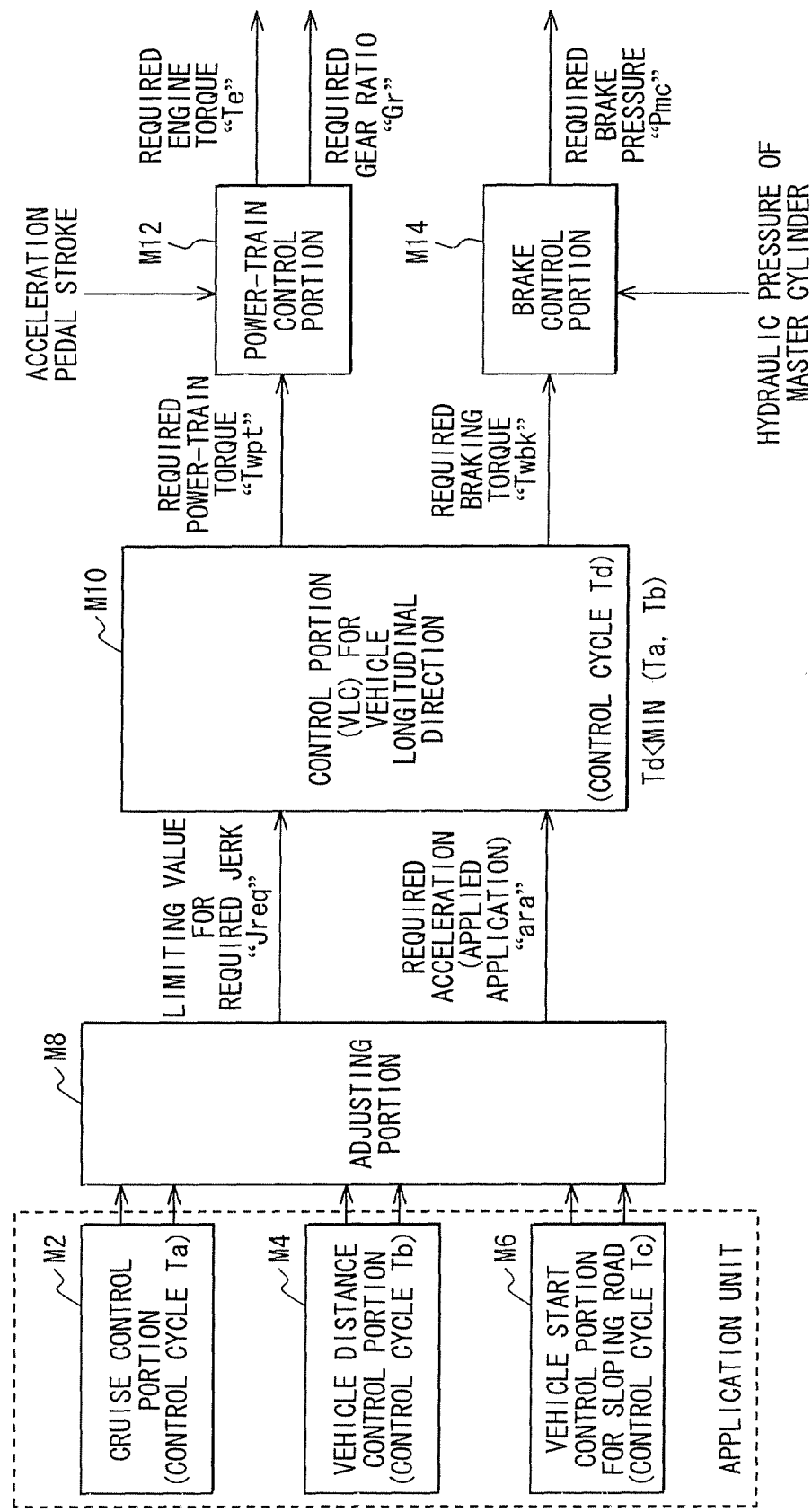
FIG. 2 is a block diagram showing a process for a vehicle automatic travel control for the above embodiment.

FIG. 2 shows a process for the automatic vehicle travel control, which is one of processes carried out by the electronic control unit 30.

In FIG. 2, a cruise control portion M2, a vehicle distance control portion M4, and a vehicle start control portion M6 for a sloping road (an uphill road) are shown as an example of an application unit for the automatic vehicle travel control. The cruise control portion M2 carries out a cruise control, according to which a vehicle running (traveling) speed is maintained at a constant value. The vehicle distance control portion M4 maintains a vehicle distance to a front vehicle at a predetermined amount. The vehicle start control portion M6 for the sloping road carries out a control for automatically changing the vehicle stopping condition to vehicle traveling condition. The vehicle traveling condition means such a condition, in which the vehicle is displaced (moved) in a vehicle traveling direction required by the vehicle driver via the user interface 32. Each of the cruise control portion M2, the vehicle distance control portion M4, and the vehicle start control portion M6 for the sloping road outputs a required value for acceleration (required acceleration) and a limiting value for required jerk (explained below).

An adjusting portion M8 outputs a final limiting value for required jerk "Jreq" and a final required acceleration (applied acceleration "ara"), based on outputs from the cruise control portion M2, the vehicle distance control portion M4, and the vehicle start control portion M6 for the sloping road.

A control portion M10 for a vehicle longitudinal direction (hereinafter, also referred to as VL control portion) outputs, based on the applied acceleration "ara", a required power-train torque "Twpt" which is a required torque to a power-train system having the engine 10 and the automatic transmission apparatus 14, as well as a required braking torque "Twbk" which is a required torque to the brake actuator 20.

A control cycle "Td" for the VL control portion M10 is different at least from a control cycle "Ta" for the cruise control portion M2 and a control cycle "Tb" of the vehicle distance control portion M4. More exactly, the control cycle "Td" for the VL control portion M10 is set shorter than the control cycle "Ta" for the cruise control portion M2 and the control cycle "Tb" of the vehicle distance control portion M4.

In each of the control portions M2, M4, and M6 of the application unit, the required acceleration is calculated based on various detected amounts from detecting means, such as a detecting means for detecting a front vehicle by radar, and detecting cycles for those detecting means are likely to become longer than detecting cycles for an actual vehicle speed or an actual acceleration. Accordingly, the control cycle "Td" is made shorter than the control cycle "Ta" or "Tb".

A power-train control portion 12 outputs a required value for the torque (a required engine torque "Te") to the engine 10 as well as a required value for a gear ratio (a required gear ratio "Gr") to the automatic transmission apparatus 14, in accordance with the required power-train torque "Twpt".

A brake control portion M14 outputs a required value for pressure of working fluid (a required brake pressure "Pmc") to the brake actuator 20, in accordance with the required braking torque "Twbk". The required brake pressure "Pmc" corresponds to an operational amount of the brake actuator 20, for adjusting braking forces at the respective driving wheels 16 and driven wheels 18 by means of fluid pressure of the working fluid.

Figure 3:
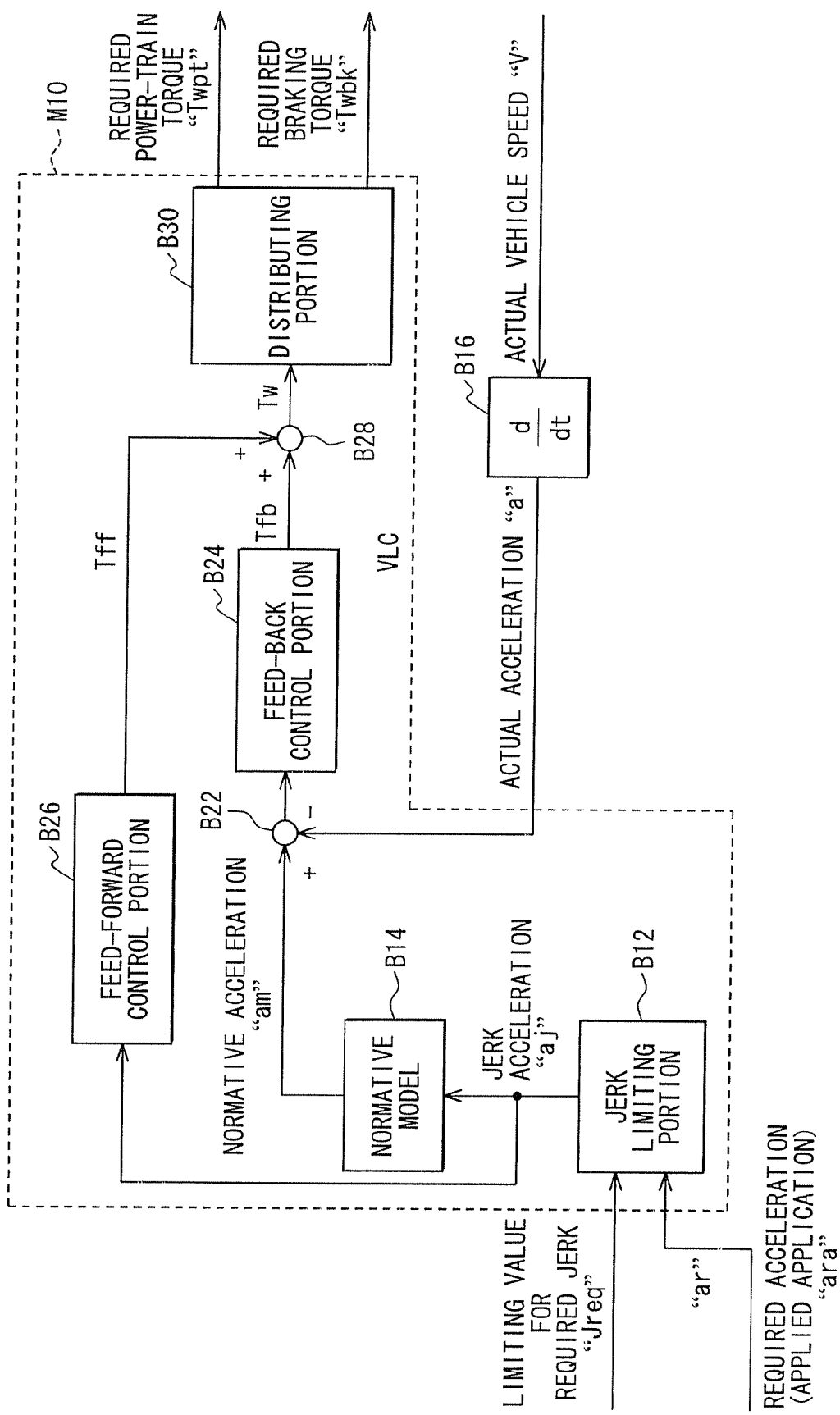
FIG. 3 is a block diagram showing a detailed process of a control portion for a vehicle longitudinal direction.

A detailed process of the VL control portion M10 for the vehicle longitudinal direction is shown in FIG. 3.

In the VL control portion M10, the applied acceleration "ara" from the adjusting portion M8 is inputted to a jerk limiting portion B12 as a required acceleration "ar". The jerk limiting portion B12 carries out a process, according to which a variation (which occurs in one control cycle of the VL control portion M10) for the required acceleration is limited to a value lower than the limiting value "Jreq" for the required jerk.

Figure 4:
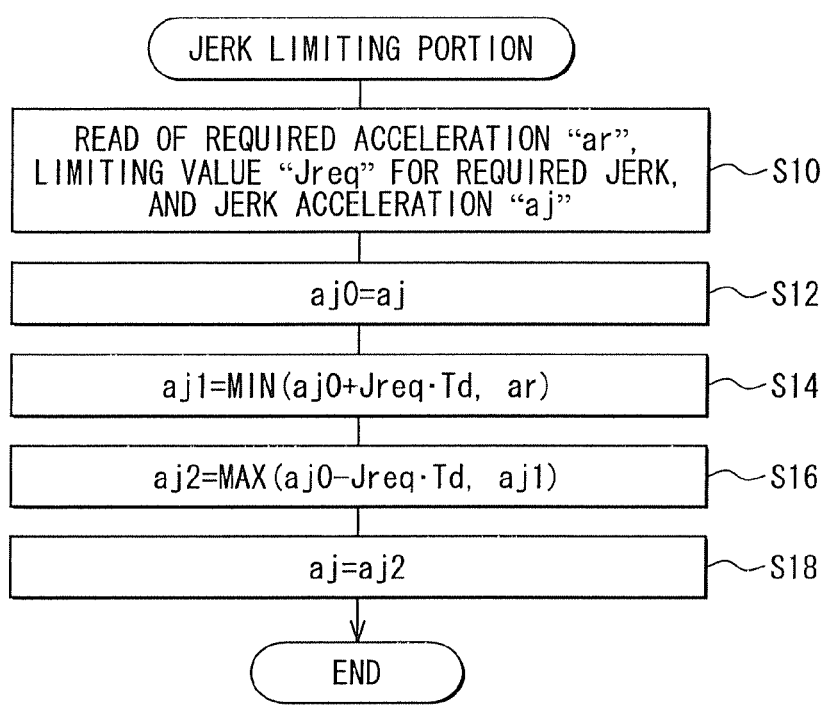
FIG. 4 is a flow-chart showing a process of a jerk limiting portion of the control portion for the vehicle longitudinal direction.

A flow-chart for a process of the jerk limiting portion B12 is shown in FIG. 4. At first, at a step S10, the jerk limiting portion B12 obtains the required acceleration "ar", the limiting value "Jreq" for the required jerk, and a jerk acceleration "aj" which is a current output from the jerk limiting portion B12. At a step S12, the jerk acceleration "aj" is replaced by a jerk acceleration "aj0" of a previous control cycle. At the following steps S14 and S16, a variation of the required acceleration "ar" is limited, so that a difference between the jerk acceleration "aj" of the current control cycle and the jerk acceleration "aj0" of the previous control cycle is controlled to be lower than the limiting value "Jreq" for the required jerk. Namely, at the step S14, a value "aj1" is obtained. The value "aj1" corresponds to a value which is calculated by adding the jerk acceleration "aj0" of the previous control cycle to an amount of the limiting value "Jreq" multiplied by the control cycle "Td", or corresponds to a value of the required acceleration "ar", whichever is smaller. At the step S16, a value "aj2" is obtained. The value "aj2" corresponds to a value which is calculated by deducting the amount of the limiting value "Jreq" multiplied by the control cycle "Td" from the jerk acceleration "aj0" of the previous control cycle, or corresponds to the above value "aj1", whichever is larger. And at a step S18, the value "aj2", which is selected as one larger than the other, is decided as the jerk acceleration "aj".

Accordingly, the jerk acceleration "aj" is changed in a stepwise manner to the required acceleration "ar" for each control cycle of the VL control portion M10 (which is shorter than the control cycles of the application units M2, M4), wherein a variation amount for the jerk acceleration "aj" for each control cycle is limited to a value smaller than the limiting value "Jreq".

In the VL control portion M10, vehicle acceleration is controlled to become the jerk acceleration "aj" by means of a control of two-degree-of-freedom. Namely, an actual vehicle acceleration is feed-backed to the jerk acceleration, and in addition the actual vehicle acceleration is feed-forwarded to the jerk acceleration. At first, the feed-back control will be explained below.

<Feed-Back Control>

Figure 5A:
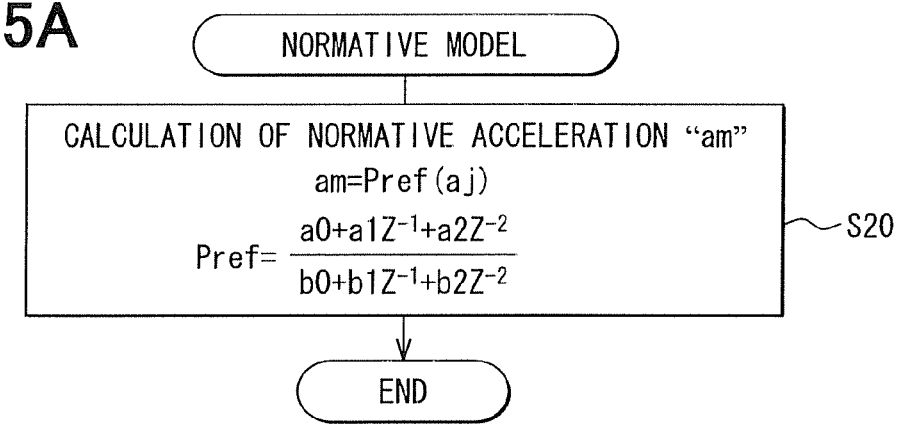
FIG. 5A is a flow-chart showing a process of a normative model setting portion of the control portion for the vehicle longitudinal direction.
Figure 5B:
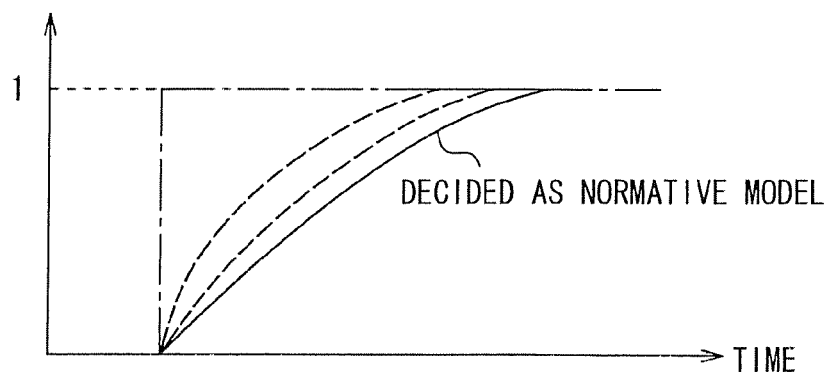
FIG. 5B is a graph showing a response characteristic in an actual vehicle, which is decided as a normative model.

In FIG. 3, the jerk acceleration "aj" is converted by a normative model setting portion B14, so that a normative acceleration "am" is outputted. The normative model setting portion B14 defines a target acceleration behavior in a vehicle transitional travel, in which the jerk acceleration "aj" is varied. A process to be carried out by the normative model setting portion B14 is a step S20 shown in FIG. 5A. Namely, the normative model corresponds to a primary-delay model. Therefore, the jerk acceleration "aj" is converted to the normative acceleration "am" by the primary-delay model. In the primary-delay model, as shown in FIG. 5B, a normative model (for response characteristic) is decided based on such response characteristic, an actual response delay of which is largest (as indicated by a solid line) among other response characteristics, when a target acceleration is changed in a step wise manner as indicated by a one-dot-chain line. In other words, since the response characteristic is changed depending on a vehicle traveling condition, such as an engine rotational speed, the response characteristic having the largest response delay is used as the normative model.

In a differential operating portion B16 of FIG. 3, an actual vehicle speed "V" is differentiated with respect to time. The actual vehicle speed "V" is calculated based on detected amounts by the wheel speed sensors 26 provided at each driving and driven wheels 16 and 18. More exactly, the actual vehicle speed "V" is calculated as an average amount of the detected amounts at the wheel speed sensors 26, or the maximum amount among such detected amounts may be decided as the actual vehicle speed "V".

A deviation calculating portion B22 of FIG. 3 calculates a deviation "err" between an actual vehicle acceleration "a" outputted from the differential operating portion B16 and the normative acceleration "am" outputted from the normative model setting portion B14.

Figure 6:
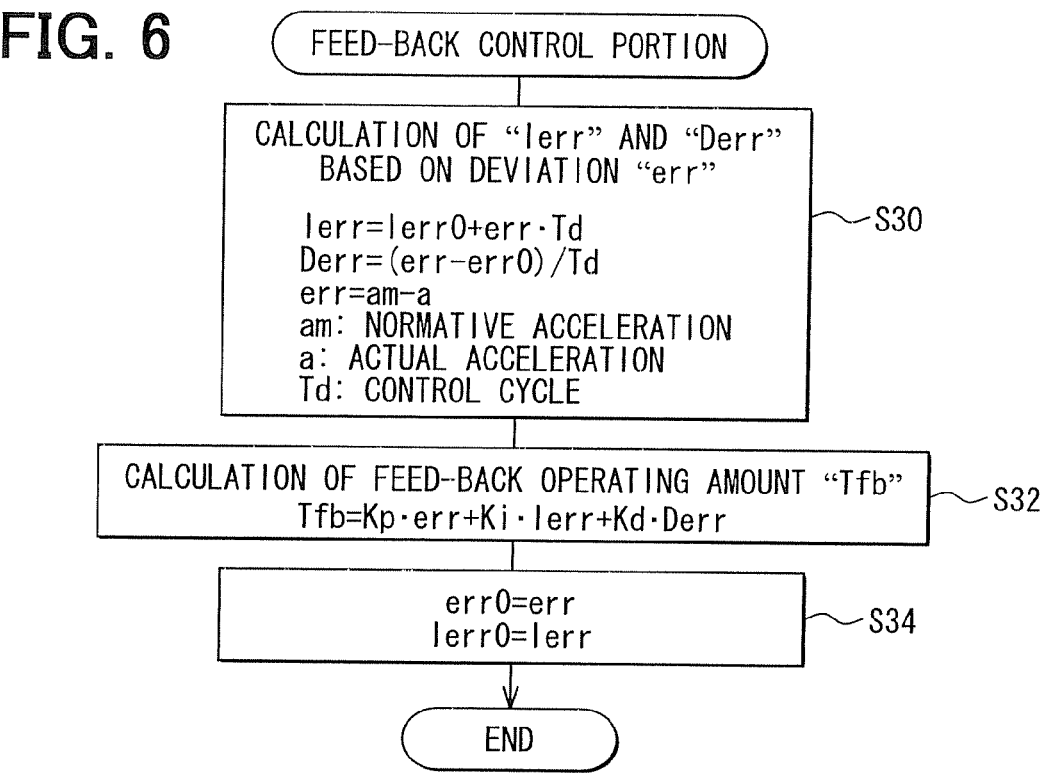
FIG. 6 is a flow-chart showing a process of a feed-back control portion of the control portion for the vehicle longitudinal direction.

In a feed-back control portion B24 of FIG. 3, the actual vehicle acceleration "a" is feed-backed to the normative acceleration "am". More exactly, according to the embodiment, a control for a proportional differential and integral calculus is carried out. A process to be carried out by the feed-back control portion B24 is shown in FIG. 6.

At first, at a step S30, an integrated amount "Ierr" and a differentiated amount "Derr" are calculated based on the deviation "err". Namely, the integrated amount "Ierr" of this time is obtained by adding a multiplied amount between the deviation "err" of this time and the control cycle "Td" to an integrated amount "err0" of a previous time. On the other hand, the differentiated amount "Derr" is obtained by dividing a subtracting amount between the deviation "err" of this time and the deviation "err0" of the previous time (that is an amount, in which the deviation "err0" of the previous time is subtracted from deviation "err" of the this time) by the control cycle "Td".

At the following step S32, a feed-back operating amount "Tfb" is calculated. Namely, the feed-back operating amount "Tfb" is obtained as a sum of an amount which is calculated by multiplying the deviation "err" by a proportional gain "Kp", an amount which is calculated by multiplying the integrated amount "Ierr" by an integration gain "Ki", and an amount which is calculated by multiplying the differentiated amount "Derr" by a differentiation gain "Kd".

The above proportional gain "Kp", integration gain "Ki", and differentiation gain "Kd" are coefficients for converting the deviation "err", the integrated amount "Ierr" and the differentiated amount "Derr" into required torque. In other words, the feed-back operating amount "Tfb" is the torque required for controlling the actual acceleration "a" to become the normative acceleration "am".

At a step S34 following the step S32, the deviation "err" is memorized as "err0" of the previous time, and the integrated amount "Ierr" is memorized as "Ierr0" of the previous time.

<Feed-Forward Control>

Now, the feed-forward control of the control of two-degree-of-freedom will be explained.

Figure 7:
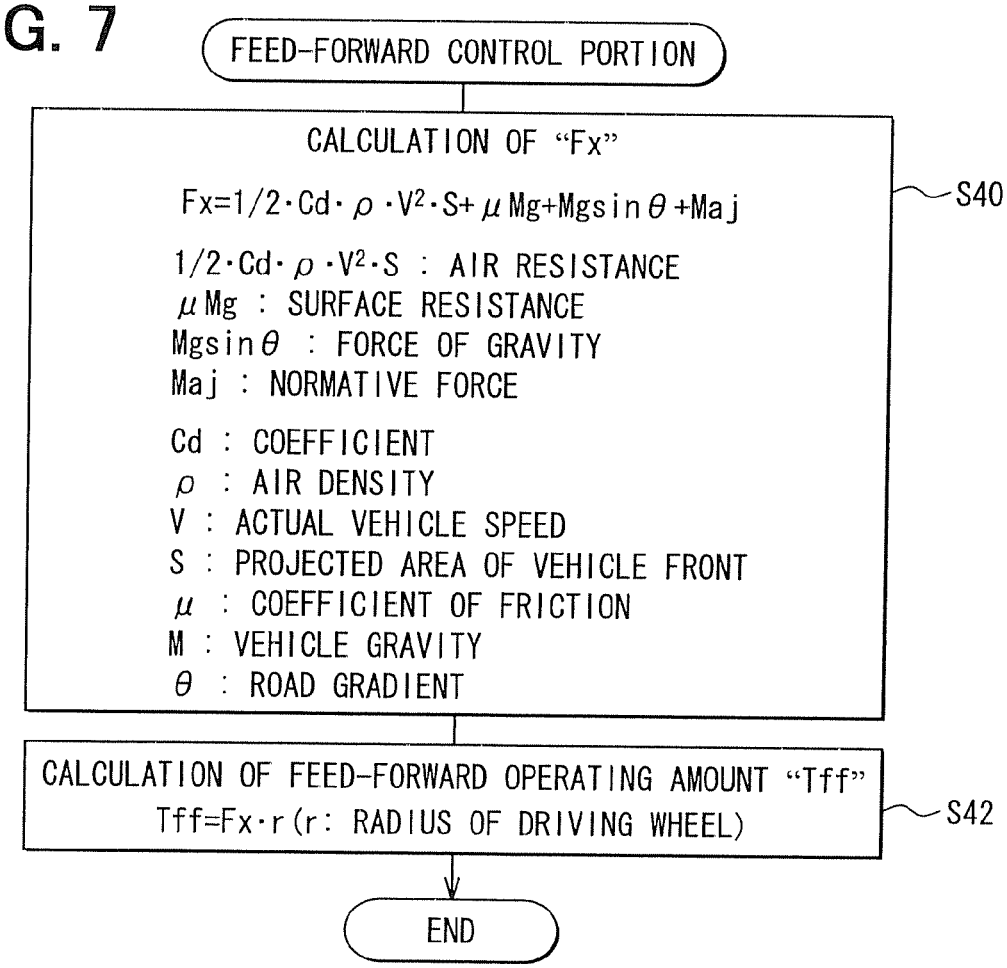
FIG. 7 is a flow-chart showing a process of a feed-forward control portion of the control portion for the vehicle longitudinal direction.

A feed-forward control portion B26 in FIG. 3 is a control portion for carrying out a feed-forward control to bring the vehicle acceleration to the jerk acceleration "aj". A process to be carried out by the feed-forward control portion B26 is shown in FIG. 7.

In the feed-forward portion B26, a force "Fx" to be applied to the vehicle in a vehicle traveling direction is calculated, so that the vehicle acceleration will become equal to the jerk acceleration "aj". The force "Fx" is calculated as a sum of air resistance, surface resistance, force of gravity, and normative force. The normative force is calculated by multiplying the jerk acceleration "aj" by vehicle gravity "M". This is a force necessary for moving the vehicle at the jerk acceleration "aj", in a condition that no resistance is applied to the vehicle for its traveling. The air resistance is a force caused by air as a result of vehicle traveling and applied to the vehicle in an opposite direction of the vehicle traveling direction.

According to the embodiment, the air resistance is calculated in the following manner. An amount, in which the actual vehicle speed "V" is raised to the second power, is multiplied by air density "ρ", coefficient "Cd", a projected area "S" of a vehicle front side, and a figure of "½".

The surface resistance is resistance force generated by friction between road surface and the driving and driven wheels 16 and 18 of the vehicle. This resistance force is calculated as a multiplied amount among the coefficient of friction "μ", the vehicle gravity "M" and force of gravity "g". The force of gravity means here a force applied to the vehicle in its traveling direction or in its opposite direction, in the case that the road is inclined. This force is expressed as "Mgsinθ", wherein "θ" is a road gradient. The road gradient "θ" can be calculated based on detected amounts for the actual vehicle speed "V" and the acceleration sensor 34.

At a step S42 following the step S40, a feed-forward operating amount "Tff" is calculated by multiplying the force "Fx" by a radius "r" of the driving wheels 16. The feed-forward operating amount "Tff" corresponds to a torque required for moving the vehicle at the jerk acceleration "aj".

In a vehicle axle torque calculating portion B28, the feed-back operating amount "Tfb" and the feed-forward operating amount "Tff" are added to calculate a required vehicle axle torque "Tw".

A distributing portion B30 divides (distributes) the required vehicle axle torque "Tw" into the required powertrain torque "Twpt" and the required braking torque "Twbk". As a result, an appropriate driving torque as well as an appropriate braking force can be applied to the vehicle wheels (the driving wheels 16 and the driven wheels 18) in order to control the actual vehicle acceleration at the required acceleration "ar". More exactly, the actual vehicle acceleration can be controlled at the jerk acceleration "aj", and the actual acceleration can be properly controlled at the normative acceleration "am" when the jerk acceleration "aj" is changed. In other words, in the case that the vehicle acceleration is feed-forwarded to the jerk acceleration "aj" when the jerk acceleration "aj" is changed, the actual acceleration has a response delay with respect to the change of the jerk acceleration "aj" due to the response delay of the vehicle. However, the actual acceleration estimated by the response delay may be approximated by the normative acceleration "am". Then, the actual acceleration can be precisely controlled at the normative acceleration "am" in the feed-back control operation.

<Vehicle Start Control on Uphill Slope>

A process carried by the vehicle start control portion M6 for the sloping road will be hereinafter explained.

When the process by the vehicle start control portion M6 is carried out, no command signal for the automatic vehicle travel is outputted from the user interface 32. Therefore, the operation for the vehicle start control portion M6 is carried out depending on a pedal stroke of an acceleration pedal or a brake pedal. For that purpose, the pedal stroke of the acceleration pedal is inputted to the power-train control portion M12, whereas a detected amount of the oil pressure sensor 23 which depends on the brake pedal stroke of the vehicle driver is inputted to the brake control portion M14, as shown in FIG. 2.

The power-train control portion M12 outputs the required engine torque "Te" and the required gear ratio "Gr", based on the manually required acceleration torque depending on the acceleration pedal stroke operated by the vehicle driver and the electronically required power-train torque "Twpt", whichever is larger.

The brake control portion M14 outputs the required brake pressure "Pmc", when the manually required braking torque based on the detected amount of the oil pressure sensor 23 is larger than the electronically required braking torque "Twbk".

Figure 8:
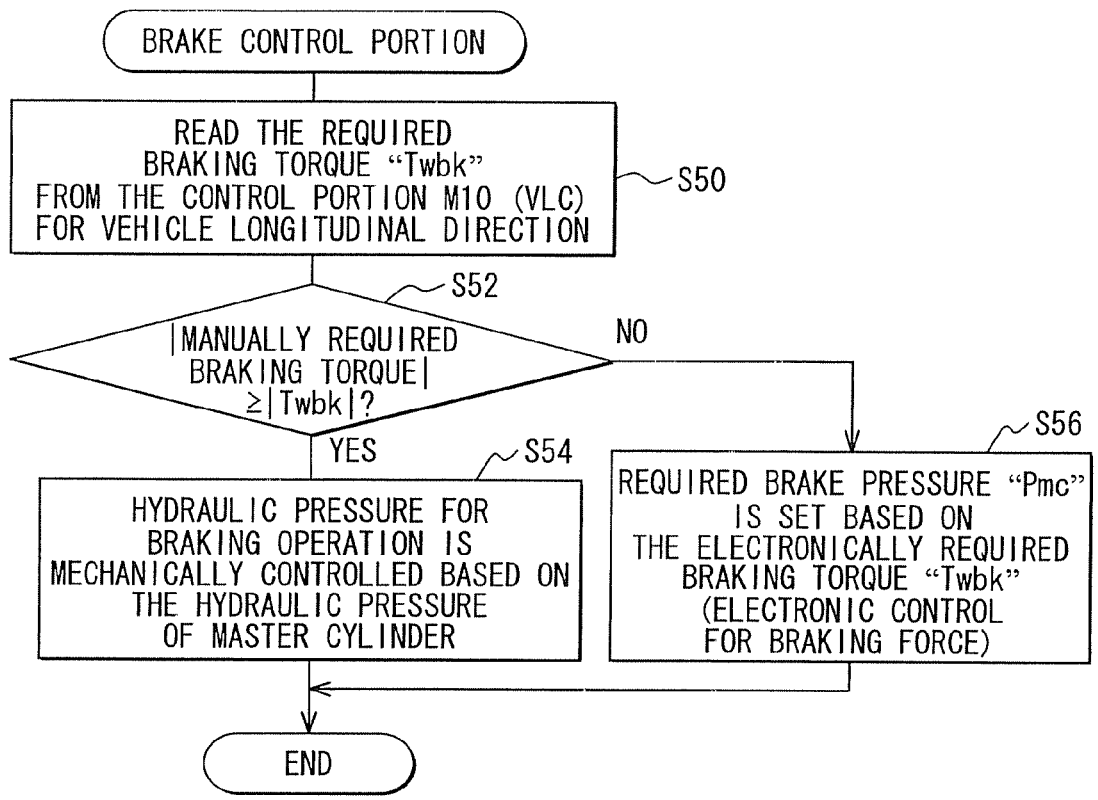
FIG. 8 is a flow-chart showing a process of a brake control portion of the above embodiment.

A process for setting the required brake pressure "Pmc" is shown in FIG. 8. The process of FIG. 8 is periodically repeated at a predetermined time cycle.

At a step S50, the brake control portion M14 reads the required braking torque "Twbk" from the VL control portion M10. Then, the brake control portion M14 determines at the following step S52 whether an absolute value of the manually required braking torque based on the detected amount of the oil pressure sensor 23 is larger than an absolute value of the electronically required braking torque "Twbk". When the determination is YES at the step S52, the hydraulic pressure in the wheel cylinders 24 is mechanically adjusted at a step S54, based on the pressure of the working fluid of the master cylinder 22. In other words, the electronic control for the pressure of the wheel cylinders (that is, the electronic control of the braking force) is not carried out. On the other hand, in the case that the determination at the step S52 is NO, the required brake pressure "Pmc" is set based on the electronically required braking torque "Twbk" at a step S56. When the steps S54 and S56 are ended, the process of FIG. 8 is temporally terminated.

Figure 9:
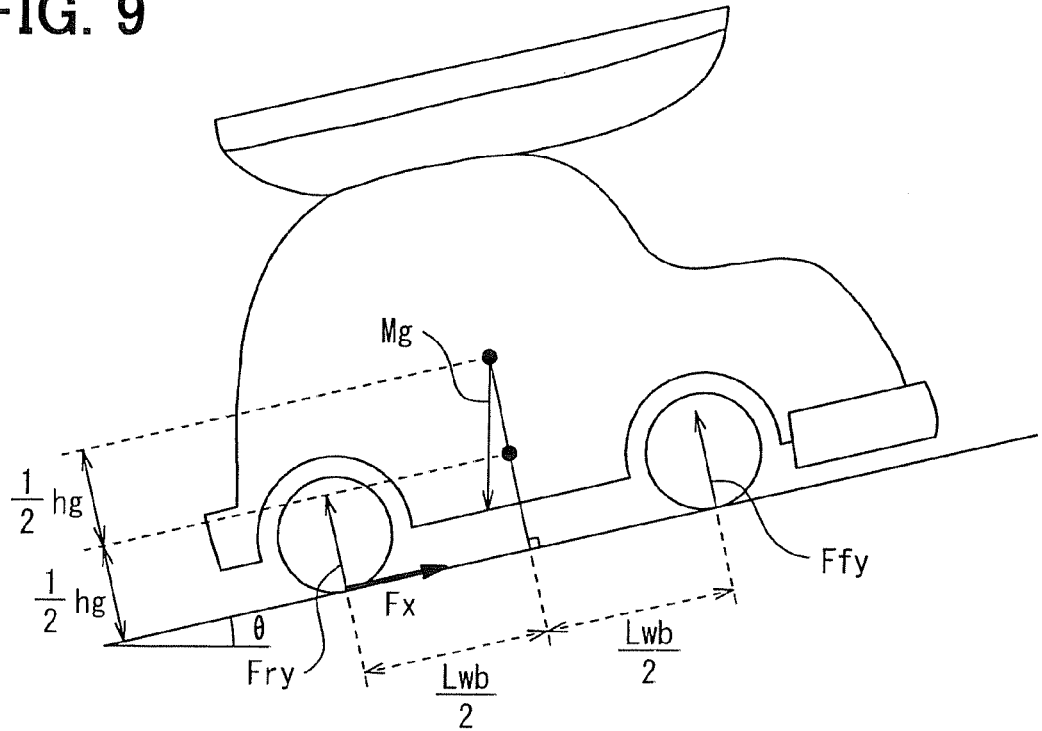
FIG. 9 is a schematic view showing forces applied to a vehicle.

Next, a process for setting an acceleration (an acceleration "as1" for vehicle start on the sloping road), which is outputted from the vehicle start control portion M6 for the sloping (uphill) road, will be explained. In FIG. 9, forces applied to the vehicle on the sloping road are shown. As shown in FIG. 9, the force of gravity "Mg", reaction force "Fry" to the driving wheel 16 in a direction perpendicular to the road surface, reaction force "Ffy" to the driven wheel 18 in a direction perpendicular to the road surface, and the driving force "Fx" are applied to the vehicle. In FIG. 9, a road gradient is designated by "θ", a distance between the road surface to a gravity center of the vehicle is designated by "hg", and a distance between two wheel axles for the driving wheels 16 and the driven wheels 18 is designated by "Lwb". It is assumed in FIG. 9 that a line extending from the gravity center in a direction perpendicular to the road surface intersects with the road surface at such a point, at which the distance "Lwb" is equally divided into two.

An equation of equilibrium in the direction perpendicular to the road surface is expressed in the following formula (c1).

$$Mg \cdot \cos \theta = Fry + Ffy \tag{c1}$$

An equation of equilibrium for moments, which are applied to an intermediate point of the line extending in the direction perpendicular to the road surface, is expressed in the following formula (c2).

$$hg \cdot Mg \cdot \sin \theta/2 + hg \cdot Fx + Lwb \cdot Ffy/2 = Lwb \cdot Fry/2 \tag{c2}$$

The following formula (c3) is obtained from the above formulas (c1) and (c2):

$$Fry = Mg(\cos \theta + hg \cdot \sin \theta/Lwb)/2 + hg \cdot Fx/2Lwb \tag{c3}$$

In this situation, friction force "μFry" applied to the driving wheels 16 becomes an upper limiting value for the driving force "Fx" without causing any slips at the driving wheels 16, wherein "μ" is coefficient of friction. In other words, a condition "Fx≦μFry" must be satisfied in order not to cause any slips at the driving wheels 16. An upper limiting value for the acceleration "as1" for vehicle start on the sloping road is expressed in the following formula (c4), wherein the above condition "Fx≦μfry" is used:

$$as1 = (Fx - Mg \cdot \sin \theta)/M \leq Lwb \cdot \mu \cdot \cos \theta/(2Lwb - \mu \cdot hg) + (2\mu \cdot hg - 2Lwb)\sin \theta/(2Lwb - \mu \cdot hg) \tag{c4}$$

Figure 10:
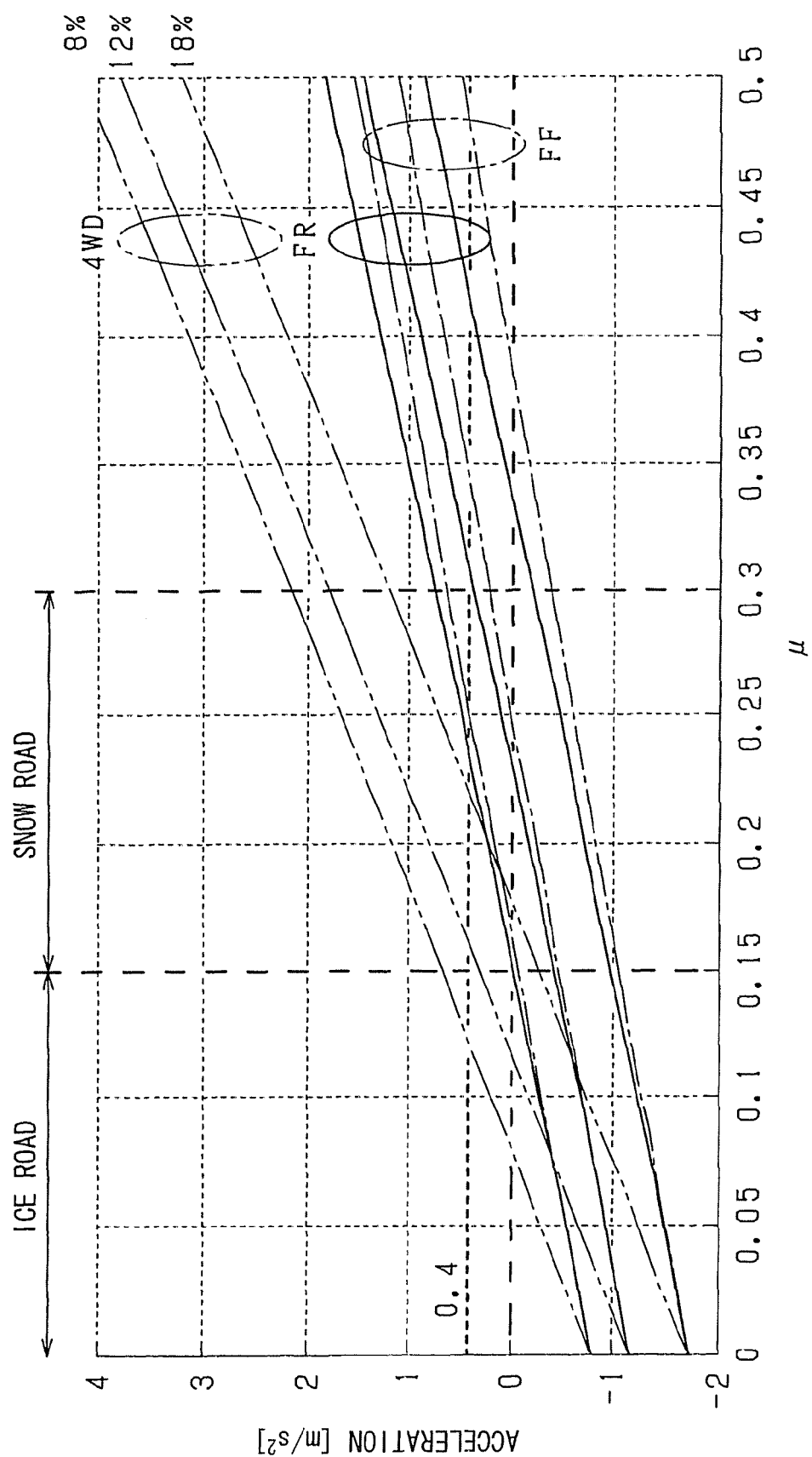
FIG. 10 is a graph showing relation among road gradient of an uphill slope, coefficient of friction, and a limiting value of acceleration for the uphill slope.

In FIG. 10, the upper limiting values for the acceleration "as1" for vehicle start on the sloping road, which are calculated based on the above formula (c4) and in which no slip may occur, are indicated by solid lines for respective sloping roads having road gradients of 8%, 12% and 18%. As shown in FIG. 10, the upper limiting values for the acceleration "as1" becomes smaller, as the coefficient of friction "μ" is smaller. Furthermore, the upper limiting values for the acceleration "as1" becomes smaller, as the road gradient is larger. In FIG. 10, one-dot-chain lines likewise show the upper limiting values for the acceleration "as1" for a vehicle of a front-wheel-driven type, whereas two-dot-chain lines likewise show the upper limiting values for the acceleration "as1" for a vehicle of a four wheel-driven type. In each of the cases, the upper limiting values for the acceleration "as1" becomes smaller, as the coefficient of friction "μ" becomes smaller or as the road gradient becomes larger.

Accordingly, the vehicle start control portion M6 for the sloping road sets the acceleration "as1" for the vehicle start on the sloping road to become smaller, as the coefficient of friction "μ" is smaller or as the road gradient is larger.

A process of the vehicle start control portion M6 will be hereinafter explained.

Figure 11:
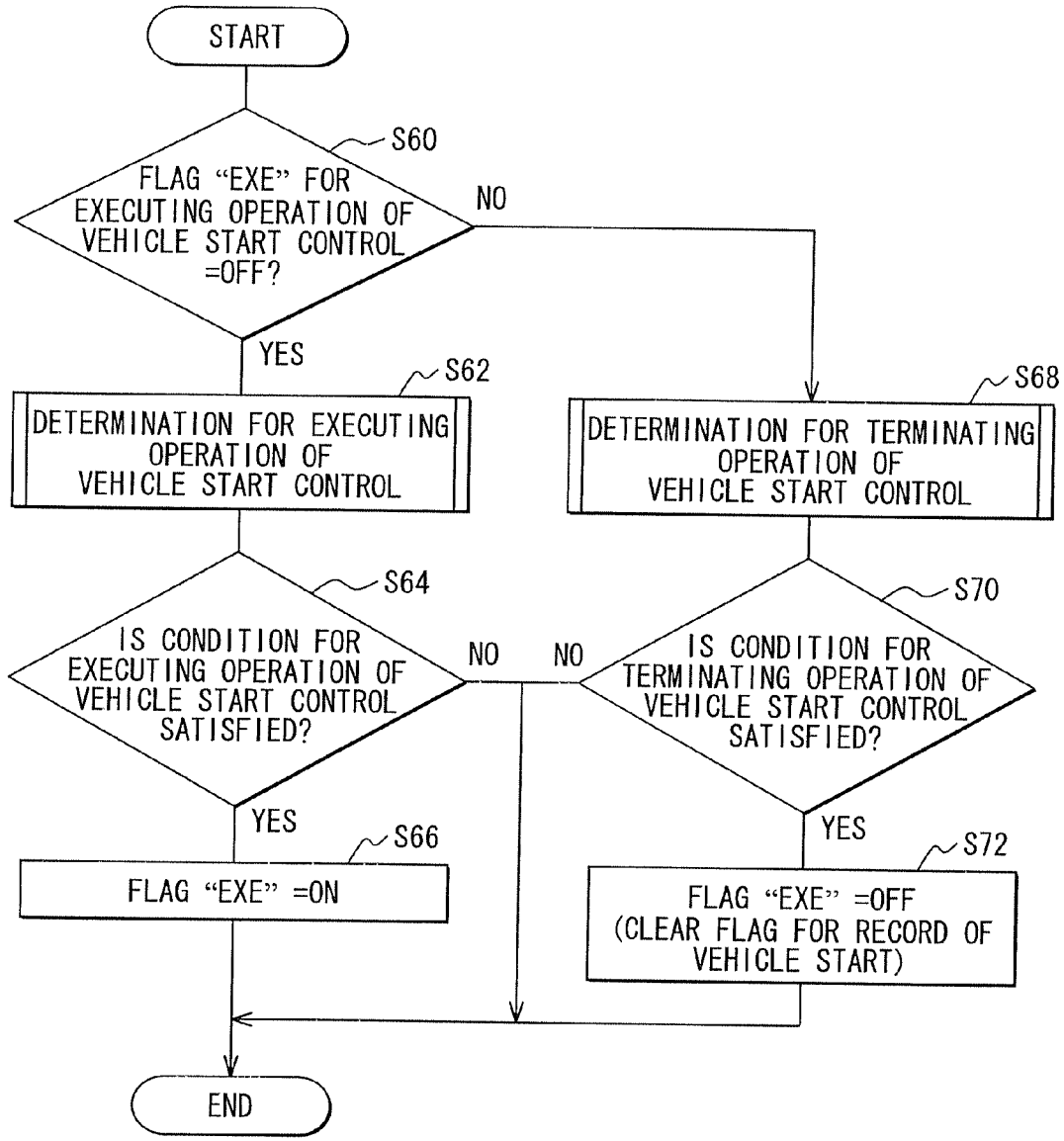
FIG. 11 is a flow-chart showing a process for starting vehicle movement on the uphill slope according to the embodiment.

A process for starting or terminating the operation for the vehicle movement on the sloping road is shown in FIG. 11.

Figure 12:
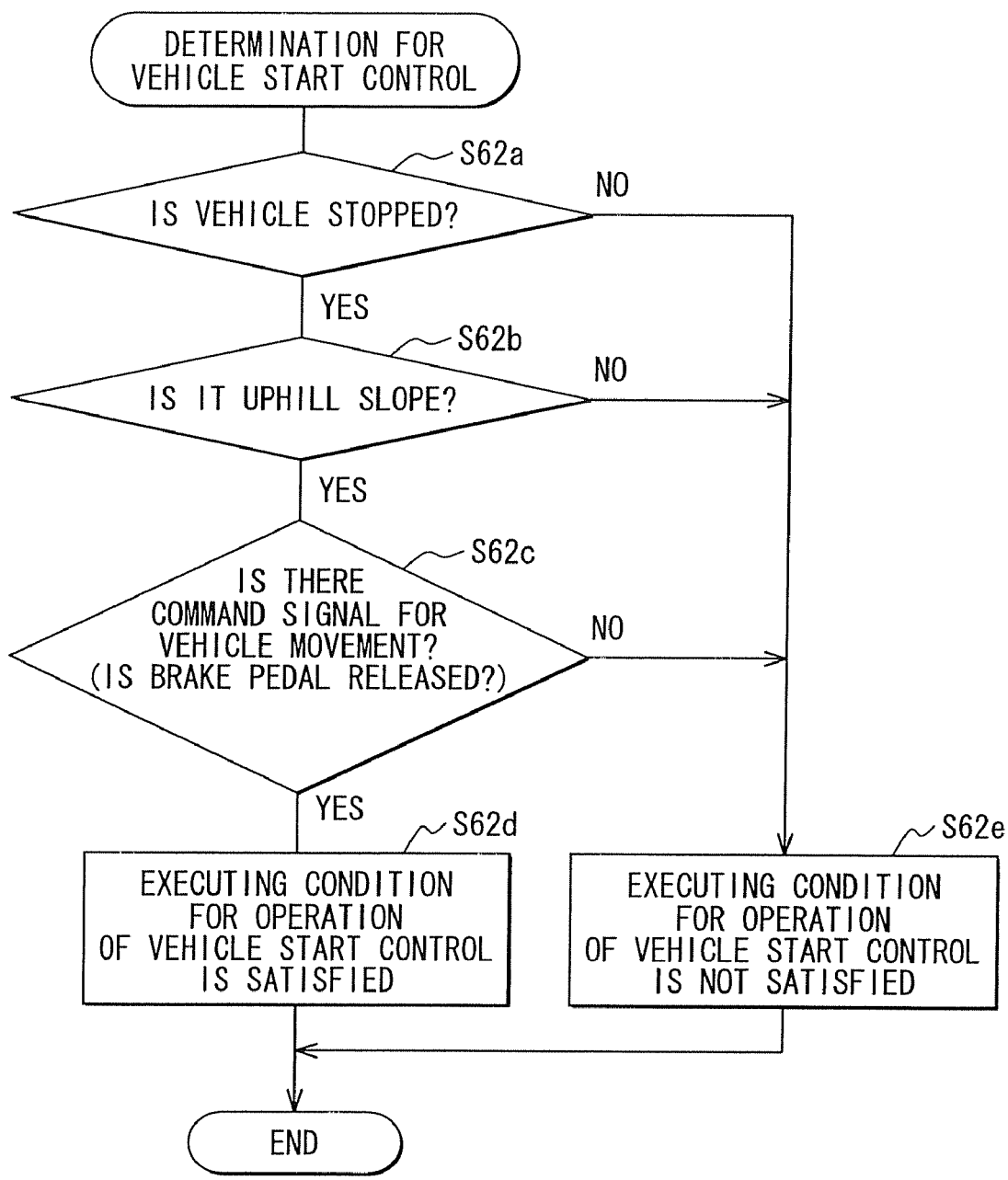
FIG. 12 is a flow-chart showing a process for determining whether an operation of vehicle start control on the uphill slope will be carried out or not.

At first, the vehicle start control portion M6 determines at a step S60 whether a flag "EXE" for executing the operation of the vehicle start control is OFF. When the determination at the step S60 is YES (namely, the flag "EXE" is OFF), the vehicle start control portion M6 determines at a step S62 whether the operation of the vehicle start control is carried out. More exactly, the determination of the step S62 is carried out by the process shown in FIG. 12.

In the case that all of the following conditions are satisfied, namely the vehicle is stopped (at a step S62a), the vehicle is on the sloping (uphill) road (at a step S62b), and there is a command signal for starting the vehicle movement (at a step S62c), the vehicle start control portion M6 determines that the executing condition for the operation of the vehicle start control is satisfied at a step S62d. On the other hand, in the case that any one of the above conditions is not satisfied, the vehicle start control portion M6 determines that the executing condition for the operation of the vehicle start control is not satisfied at a step S62e.

Whether the vehicle is on the uphill slope or not is determined based on the road gradient "θ" and a vehicle traveling direction indicated by the user interface 32. Namely, the uphill slope is determined in the case that the front wheel of the vehicle is at a higher position than the rear wheel, and it is indicated by the user interface 32 (for example, by a shift lever) that the vehicle is traveling in the forward direction. In other words, the vehicle start control portion M6 determines that it is not the uphill slope, in the case that the user interface 32 indicates that the vehicle is traveling in the backward direction.

Whether there is the command signal for starting the vehicle movement or not is determined whether the brake pedal 21 is released from the braking operation by the vehicle driver. When the step S62d or the step S62e is ended, the step S62 of FIG. 11 is terminated (completed).

At a step S64 of FIG. 11, the vehicle start control portion M6 determines whether the executing condition for the operation of the vehicle start control is satisfied. In case of YES, the flag "EXE" for executing the operation of the vehicle start control is turned ON at a step S66.

Figure 13:
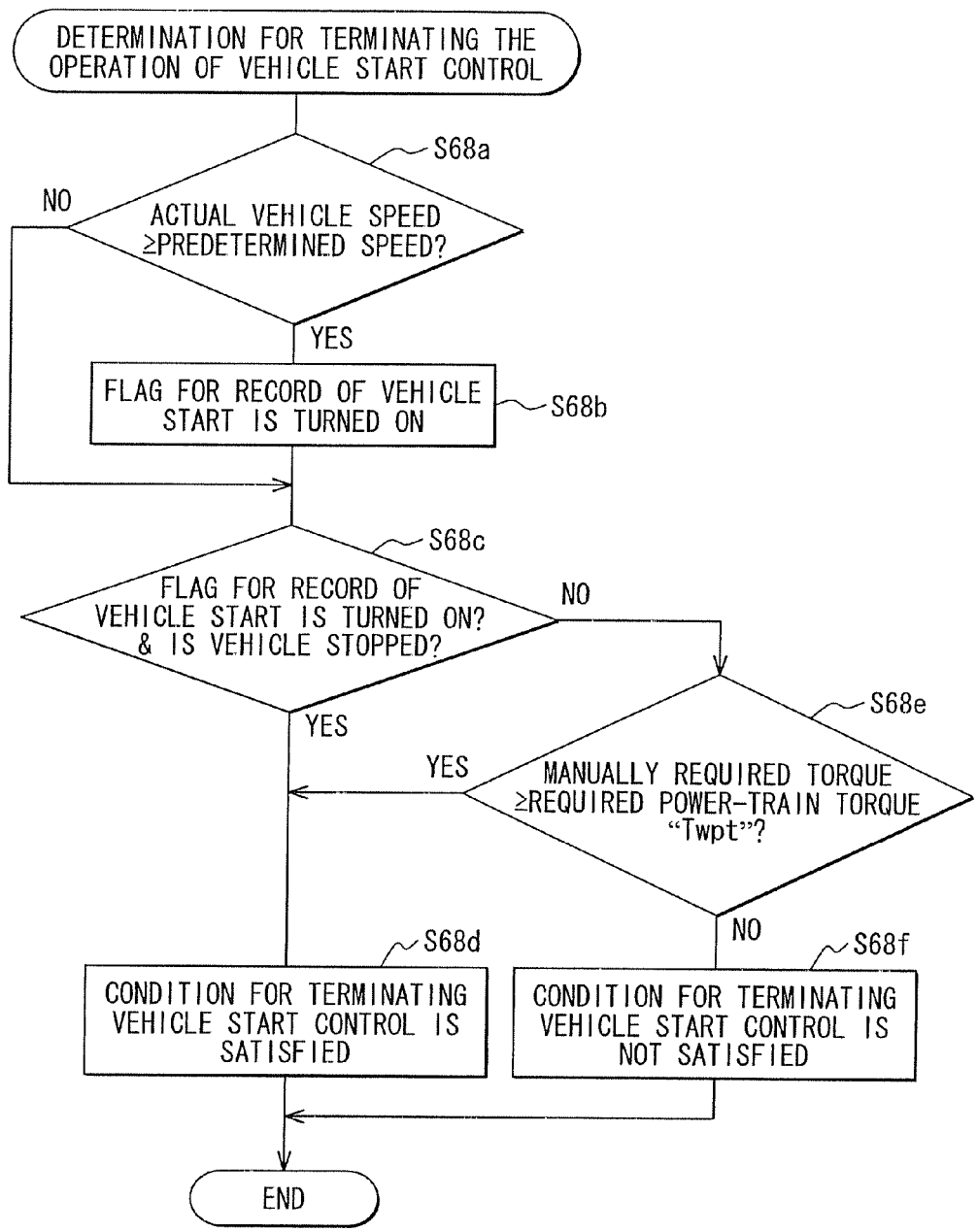
FIG. 13 is a flow-chart showing a process for determining whether the operation of vehicle start control on the uphill slope will be terminated or not.

In the case that the determination at the step S60 is NO, the vehicle start control portion M6 determines whether the operation of the vehicle start control is terminated or not at a step S68, a detailed process of which is shown in FIG. 13.

At a step S68a, the vehicle start control portion M6 determines whether the actual vehicle speed "V" is larger than a predetermined speed. This step S68a is a step for determining whether the vehicle movement is changed to the vehicle travel condition through the operation of the vehicle start control for the sloping road. The predetermined speed here is set at such a speed, at which the vehicle speed may not be brought into a vehicle stop condition (the vehicle speed may not become zero) due to an accidental control error during the operation of the vehicle start control for the sloping road once the vehicle speed has reached at this speed. In other words, the predetermined speed here is a speed, by which the vehicle start control portion M6 may determine that the vehicle is surely moving in its forward traveling direction. When the vehicle start control portion M6 determines that the actual vehicle speed "V" is larger than the predetermined speed, the process goes to a step S68b, at which a flag for a record of the vehicle start is turned ON, wherein the flag indicates that the vehicle movement is changed to the vehicle travel condition through the operation of the vehicle start control for the sloping road.

In the case that the determination of the step S68a is NO, or in the case that the process of the step S68b is ended, the process goes to a step S68c, at which the vehicle start control portion M6 determines whether the flag for the record of the vehicle start is ON and whether the vehicle is stopped. This step S68c is a step for determining whether a condition for terminating the operation of the vehicle start control for the sloping road is satisfied or not. Namely, in the case that the flag for the record of the vehicle start is ON and the vehicle is stopped, the vehicle can be regarded as having stopped as a result of a brake pedal operation by the vehicle driver after the vehicle movement had been once changed to the vehicle travel condition through the operation of the vehicle start control for the sloping road. In this situation, it should be regarded that the vehicle driver wants to stop the vehicle. Therefore, at a step S68d, the vehicle start control portion M6 determines that the condition for terminating the operation of the vehicle start control for the sloping road is satisfied.

On the other hand, when the determination of the step S68c is NO, the vehicle start control portion M6 determines at a step S68e whether the manually required acceleration torque based on the acceleration pedal stroke operated by the vehicle driver is larger than the electronically required power-train torque "Twpt". This step S68e is also a step for determining whether a condition for terminating the operation of the vehicle start control for the sloping road is satisfied or not. In other words, in the case that the manually required acceleration torque is larger than the electronically required power-train torque "Twpt", it should be regarded that the vehicle driver wants the vehicle traveling. Therefore, at the step S68d, the vehicle start control portion M6 likewise determines that the condition for terminating the operation of the vehicle start control for the sloping road is satisfied. Contrary to that, in the case that the manually required acceleration torque is smaller than the electronically required power-train torque "Twpt", the vehicle start control portion M6 determines at a step S68f that the condition for terminating the operation of the vehicle start control for the sloping road is not satisfied. When the step S68d or the step S68f is ended, the step S68 of FIG. 11 is terminated (completed).

At a step S70 of FIG. 11, the vehicle start control portion M6 determines whether a condition for terminating the operation of the vehicle start control is satisfied. In the case that the condition therefor is determined as having been satisfied, the flag "EXE" for executing the operation of the vehicle start control is turned OFF and the flag for the record of the vehicle start is cleared up at a step S72. When the determination at the steps S64 or S70 is NO, or when the steps S66 or the step S72 is ended, the process of FIG. 11 is terminated.

Figure 14:
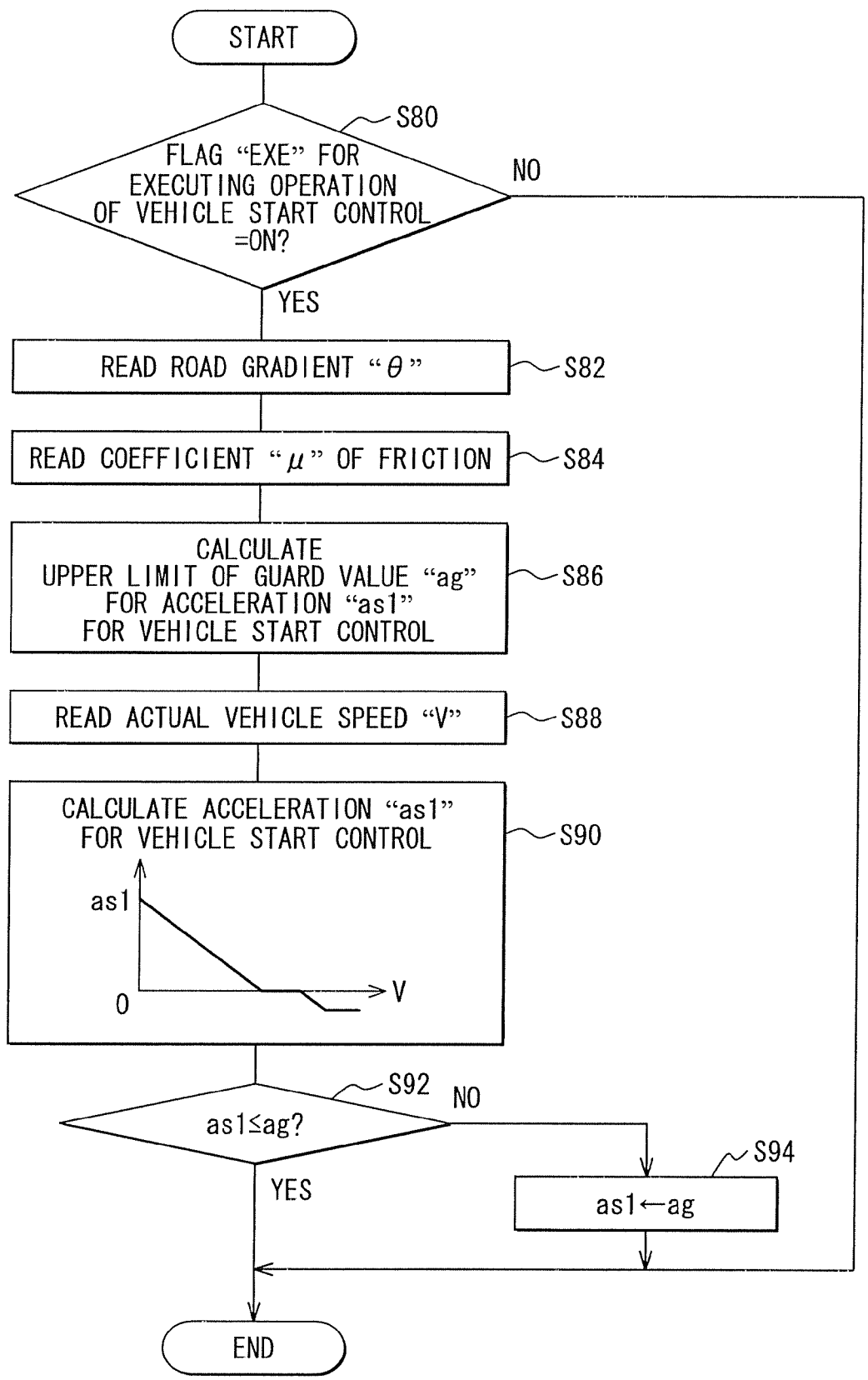
FIG. 14 is a flow-chart showing a detailed process for vehicle start control on the uphill slope according to the embodiment.

A detailed process for the operation of the vehicle start control for the sloping road is shown in FIG. 14, wherein the process is repeated at a predetermined control cycle.

Figure 15A:
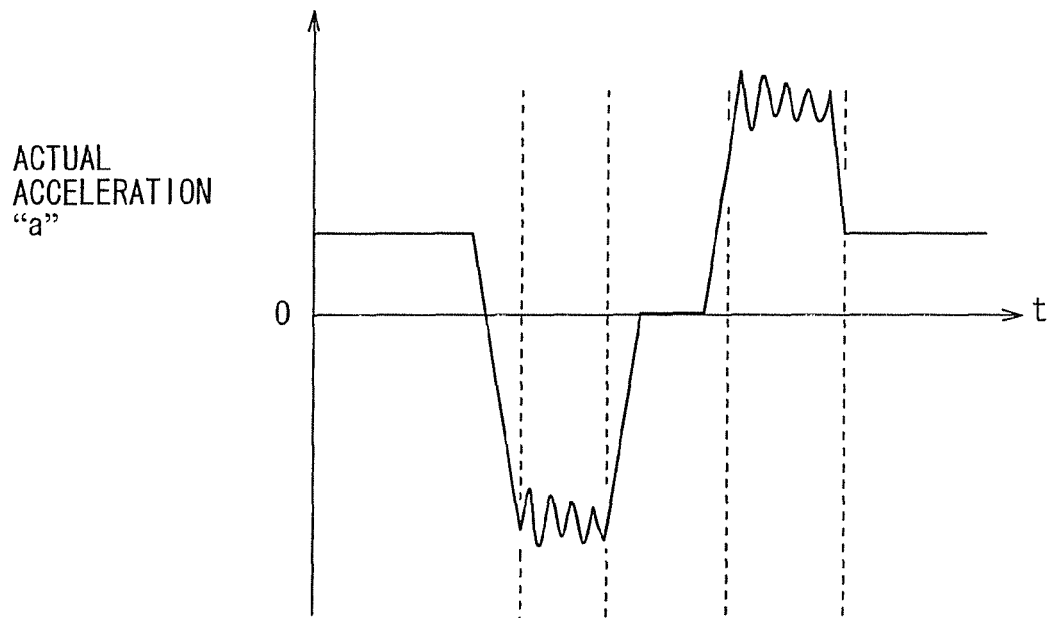
FIGS. 15A to 15C are time charts showing a method for estimating coefficient of friction between the road surface and the vehicle wheels.
Figure 15B:
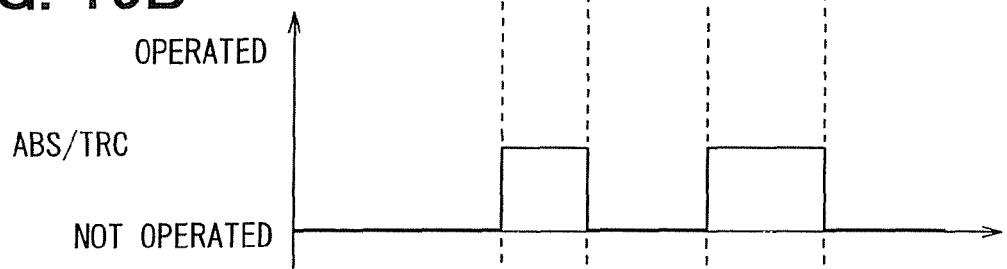
Figure 15C:
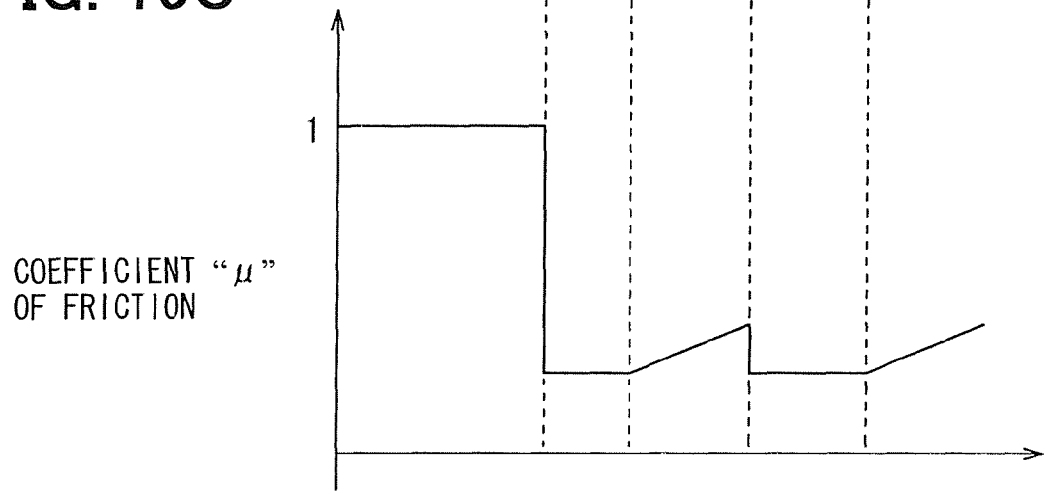

At a step S80, the vehicle start control portion M6 determines whether the flag "EXE" for executing the operation of the vehicle start control for the sloping road is ON. When the determination is YES at the step S80, the vehicle start control portion M6 reads the road gradient "θ" at a step S82. Then, at the following step S84, the vehicle start control portion M6 reads the coefficient "μ" of friction between the road surface and the vehicle wheels. As shown in FIGS. 15A to 15C, the vehicle start control portion M6 reads the coefficient "μ" of friction, based on an operating condition of an anti-lock braking system (ABS) or an operating condition of a traction control system (TRC) until the vehicle will be stopped. FIG. 15A shows a transition of the actual acceleration "a", FIG. 15B shows a transition of operations for ABS and/or TRC, and FIG. 15C shows a transition for the coefficient "μ" of friction. The acceleration in case of starting the operation for ABS or TRC corresponds to a critical acceleration for starting slips. Accordingly, the coefficient "μ" of friction can be calculated based on the acceleration of such situation. However, since the coefficient "μ" of friction varies depending on road condition (road position), or noise may be included in the actual acceleration "a", a modification process is carried out during a calculation process for the coefficient "μ" of friction, to modify such calculated amount (to absorb variations caused by the road position, noise and so on). For example, a process for weighted average is carried out between a calculated amount of this time for the coefficient "μ" of friction which is directly calculated from the actual acceleration "a" and a calculated amount of previous time.

At a step S86, the vehicle start control portion M6 calculates an upper limit of a guard value "ag" (the upper limiting value) for the acceleration "as1" for vehicle start on the sloping road, based on the formula (c4). The vehicle start control portion M6 reads the actual vehicle speed "V" at a step S88, and calculates, at the next step S90, the acceleration "as1" for vehicle start on the sloping road based on the actual vehicle speed "V". As shown in FIG. 14 (a graph shown in the step S90), the acceleration "as1" is made smaller as the vehicle speed is increased. The acceleration "as1" is made zero when the vehicle speed is higher than a first predetermined speed and lower than a second predetermined speed, a range between which (between the first and second speeds) is provided as an insensitive range. Furthermore, when the vehicle speed becomes higher than the second predetermined speed, the acceleration "as1" is made to a negative value. This characteristic for the acceleration "as1" is set for the purpose of avoiding such a case, in which the vehicle start may be prevented by the brake pedal operation by the vehicle driver in the case that the vehicle speed becomes excessively higher.

At the following step S92, the vehicle start control portion M6 determines whether the acceleration "as1" for vehicle start on the sloping road is lower than the upper limit of the guard value "ag". In case of NO at the step S92, the process goes to a step S94, at which the acceleration "as1" for vehicle start on the sloping road is made to be an amount equal to the upper limit of the guard value "ag".

The process of FIG. 14 is terminated when the determination at the step S80 is NO, the determination at the step S92 is YES, or the step S94 is finished.

As a result that the acceleration "as1" for vehicle start on the sloping road is set as above, the vehicle movement can be automatically changed to the vehicle travel condition without causing the slips at the vehicle wheels.

However, even in the case that the required vehicle axle torque "Tw" is calculated and set based on the acceleration "as1" for vehicle start on the sloping road, controllability for vehicle start on the sloping road may be reduced if a response delay occurs in the torque to be generated in the power-train system. A process shown in FIG. 16, which is carried out by the distributing portion B30 of FIG. 3, is provided in the embodiment of the present invention in order to overcome the above drawback.

At a step S100, the distributing portion B30 reads the required vehicle axle torque "Tw". At a step S102, the distributing portion B30 determines whether the required vehicle axle torque "T" is larger than a minimum torque "Tptmin". This is a step for determining whether the required vehicle axle torque "Tw" can be generated by the power-train system alone. The minimum torque "Tptmin" is a minimum torque, which can be achieved by the engine 10 and the automatic transmission apparatus 14. When the required vehicle axle torque "Tw" is larger than the minimum torque "Tptmin", the distributing portion B30 determines that the required vehicle axle torque "Tw" can be generated by the power-train system alone. And the process goes to a step S104, at which the required power-train torque "Twpt" is set at the required vehicle axle torque "Tw". On the other hand, when the determination of the step S102 is NO, the distributing portion B30 determines that the required vehicle axle torque "Tw" can not be generated by the power-train system alone. And the process goes to a step S106, at which the required power-train torque "Twpt" is set at the minimum torque "Tptmin".

When the process at the step S104 or the step S106 is completed, the distributing portion B30 determines at a step S108 whether it is a timing in a period from a time point where the required acceleration "ar" has become larger than zero to a time point where the actual acceleration "a" will become larger than zero. This is a step for determining whether it is a time period during which the vehicle movement is changed from the vehicle stopping condition (from the start of the vehicle start control for the sloping road) to the vehicle traveling condition.

When the determination at the step S108 is NO, the process goes to a step S110, at which the distributing portion B30 determines whether the actual vehicle speed is zero and the required acceleration "ar" is also zero. This is a step for determining whether the vehicle is indicated to be in the vehicle stopping condition and the vehicle is actually in the stopped condition.

When the determination at the step S110 is NO, the process goes to a step S112, at which the required braking torque "Twbk" is selected as such a value which is obtained by subtracting the minimum torque "Tptmin" from the required vehicle axle torque "Tw" or a value equal to zero, whichever is smaller.

On the other hand, when the determination at the step S110 is YES, the process goes to a step S114, at which the required braking torque "Twbk" is set to be such a value, which is a sum of an amount, that is a negative figure of an absolute amount corresponding to a difference between the minimum torque "Tptmin" and a torque "Trg" of the road gradient, and an amount of a basic torque "Tstp" for vehicle stop.

The torque "Trg" of road gradient (Trg>0) is calculated based on the road gradient "θ", and the torque "Trg" of the road gradient is a torque which counterbalances a component of force of gravity in a direction opposite to the vehicle traveling direction. The basic torque "Tstp" for vehicle stop (Tstp<0) is a margin torque for keeping the vehicle in its stop condition.

According to the process of FIG. 16, a torque necessary for the vehicle stop can be always generated independently from the minimum torque "Tptmin" generated by the power-train system or the degree of the torque "Trg" of road gradient.

When the determination at the step S108 is YES, the process goes to a step S116, at which the required braking torque "Twbk" is selected as such a value which is obtained by subtracting the torque "Trg" of road gradient from an estimated power-train torque "Twpte" (which is estimated as being generated by the power-train system) or a value equal to zero, whichever is smaller. This is a step for avoiding such a case, in which the vehicle may be moved in the opposite direction to the vehicle traveling direction during the operation for vehicle start control for the sloping road.

When the vehicle start control portion M6 for the sloping road outputs the acceleration "as1" for the vehicle start on the sloping road, the VL control portion M10 calculates the required vehicle axle torque "Tw". Since the required vehicle axle torque "Tw" is calculated based on the feed-forward operating amount "Tff", the required vehicle axle torque "Tw" is calculated as such a torque, which counteracts an influence of force of gravity caused by the road gradient "θ" and furthermore which corresponds to the acceleration "as1" for the vehicle start on the sloping road.

However, even when the required power-train torque "Twpt" is calculated depending on the required vehicle axle torque "Tw", there is a response delay in which the torque actually generated by the power-train system follows an increase of the required power-train torque "Twpt". Therefore, the torque actually generated by the power-train system is not large enough to make such actually generated torque as the acceleration "as1" for the vehicle start on the sloping road, at such a time shortly after the brake pedal operation is released and the operation for the vehicle start control for the sloping road has been started. In addition, the above torque actually generated by the power-train system may not be large enough to prevent the vehicle from moving in the opposite direction to the vehicle traveling direction. Accordingly, if the required braking torque "Twbk" is immediately made to zero in such situation (the operation for the vehicle start control for the sloping road is started), the vehicle may be moved in the opposite direction to the vehicle travel direction.

Therefore, according to the embodiment of the present invention, the response delay from the change of the required power-train torque "Twpt" to the generation of the torque actually generated by the power-train system is taken into consideration for the purpose of calculating the estimated power-train torque "Twpte". In the case that the estimated power-train torque "Twpte" comes short with respect to the torque "Trg" of the road gradient, such a shortfall is made up by braking force generated by the brake actuator 20. As a result, during the operation for the vehicle start control for the sloping road, the vehicle is prevented from moving in the opposite direction to the vehicle traveling direction before the vehicle movement is changed from the vehicle stopping condition to the vehicle traveling condition.

When the steps S112, S114 and S116 are completed, the process of FIG. 16 is terminated.

Figure 17:
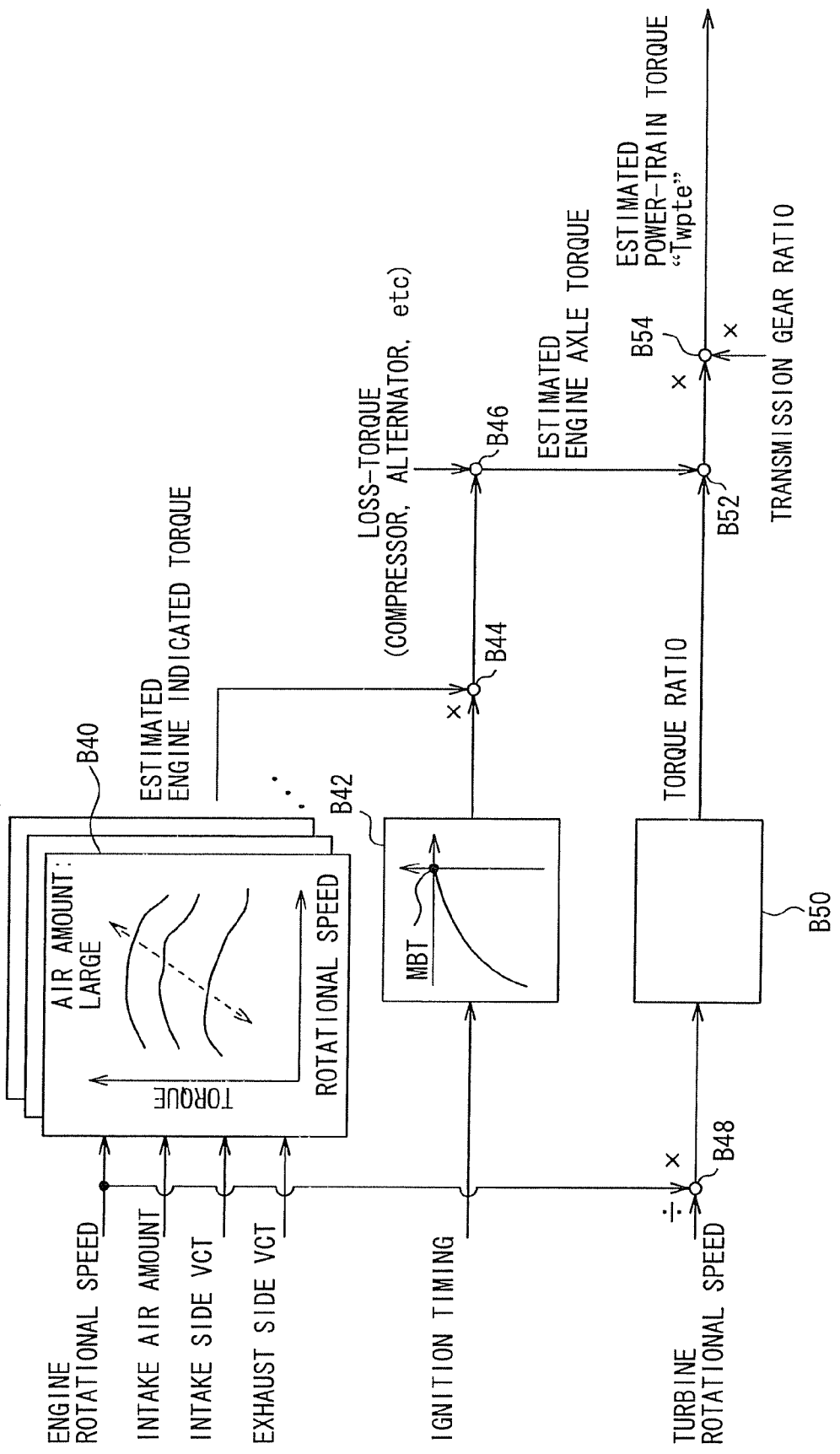
FIG. 17 is a block diagram schematically showing a process for calculating an estimated power-train torque according to the embodiment.

A process for calculating the estimated power-train torque "Twpte" is shown in FIG. 17 as one of examples.

In FIG. 17, an estimating portion B40 for engine indicated torque calculates estimated engine indicated torque, wherein parameters for operating condition of the engine 10 are inputted. As input parameters, engine rotational speed, intake air amount, rotational phase-contrast (intake side VCT) between a cam angle on an intake side and a crank angle, rotational phase-contrast (exhaust side VCT) between a cam angle on an exhaust side and the crank angle, and so on are inputted to the estimating portion B40.

An ignition timing correcting portion B42 calculates correction coefficient for correcting the estimated engine indicated torque based on ignition timing. A correcting portion B44 corrects the estimated engine indicated torque calculated by the estimating portion B40 by the correction coefficient calculated by the ignition timing correcting portion B42. An estimating portion B46 for engine axle torque calculates estimated engine axle torque by adding loss-torque to an output from the correcting portion B44.

A calculating portion B48 for speed ratio calculates a ratio of engine rotational speed with respect to turbine rotational speed of a torque converter. A torque ratio calculating portion B50 calculates a ratio of torque (a torque ratio) outputted from the torque converter with respect to axle torque of the engine 10, based on the ratio of the above rotational speeds. A calculating portion B52 calculates torque to be generated by the torque converter based on the estimated engine axle torque and the torque ratio. A calculating portion B54 calculates the estimated power-train torque "Twpte" by correcting the torque generated by the torque converter with a transmission gear ratio.

FIGS. 18A to 18D show control manner for the vehicle start control on the sloping road. FIG. 18A shows a transition of the vehicle speed, FIG. 18B shows a transition of the actual vehicle acceleration, FIG. 18C shows a transition of driving torque applied by the power-train system to the driving wheels 16, and FIG. 18D shows a transition of braking torque (−Twbk) applied by the brake actuator 20 to the vehicle wheels 16 and 18. A one-dot-chain line of FIG. 18D shows the braking torque generated by the brake pedal operation by the vehicle driver.

As shown in FIGS. 18A to 18D, the operation for the vehicle start control for the sloping road is started at a timing t1, at which the brake pedal 21 is released from the brake pedal operation by the vehicle driver. In this situation, the braking torque is reduced as the driving torque is increased. As a result, a sum of the braking torque and the driving torque is counterbalanced with the torque "Trg" of the road gradient, and the vehicle is thereby prevented from moving in the opposite direction to the vehicle traveling direction. At a timing t2, at which the vehicle starts its movement in the vehicle traveling direction (that is, the vehicle condition is changed to the vehicle traveling condition), the driving torque becomes larger than the torque "Trg" of the road gradient and the braking torque becomes zero. Accordingly, when the actual acceleration becomes larger than zero, the vehicle is not prevented from traveling by the braking torque, so that the driving torque can be sufficiently used for the vehicle travel. In addition, since the actual acceleration is limited to be lower than the upper limit of the guard value "ag" (the upper limiting value), the vehicle wheels are properly prevented from slipping. Therefore, even in the case that there is snow cover on the sloping road, the vehicle can be smoothly moved to the vehicle traveling condition without causing the slips of the wheels.

The above explained embodiment has the following advantages:

(1) In case it becomes necessary to bring the vehicle from its stopping condition to its traveling condition, the power-train system is controlled based on the information regarding the road surface in order to automatically change the vehicle condition from the stopping condition to the traveling condition. With such an arrangement, it becomes possible to minutely adjust the torque generated by the power-train system, although such a minute adjustment for the torque is generally difficult by the operation of the acceleration pedal. As a result, the vehicle condition can be properly changed to the vehicle traveling condition.

(2) The vehicle condition is automatically changed from the vehicle stopping condition to the vehicle traveling condition, wherein the torque generated by the power-train system is limited, based on the information regarding the road surface, to such a range within which the slips may not occur at the vehicle wheels. According to the above feature, any inconveniences which might occur due to the wheel slips can be avoided during the transition period to the vehicle traveling condition.

(3) The vehicle acceleration (the acceleration "as1" for the vehicle start on the sloping road) is made smaller as the road gradient becomes larger, when the operation for the vehicle start control is carried out. According to the above feature, the wheel slips can be properly avoided during the transition period to the vehicle traveling condition.

(4) The vehicle acceleration is made smaller as the frictional force (the coefficient "μ" of friction) between the road surface and the vehicle wheels becomes smaller when the operation for the vehicle start control on the sloping road is carried out. According to the above feature, the wheel slips can be likewise properly avoided during the transition period to the vehicle traveling condition.

(5) The upper limiting value (the guard value "ag" for the upper limit) is set based on the information regarding the road surface, and the actual vehicle acceleration is controlled to be lower than the guard value "ag". As a result, the wheel slips can be also properly avoided when the operation for the vehicle start control is carried out.

(6) The target acceleration (the acceleration "as1" for the vehicle start on the sloping road) is set as to be lower than the guard value "ag" for the upper limit, so that the power-train system is controlled to achieve such target acceleration. According to the above feature, the acceleration can be properly controlled for the purpose of changing the vehicle condition to the vehicle traveling condition.

(7) The target acceleration (the acceleration "as1" for the vehicle start on the sloping road) is set based on the actual vehicle speed "V". According to the above feature, the vehicle speed "V" can be properly controlled.

(8) The target acceleration (the acceleration "as1" for the vehicle start on the sloping road) is made smaller as the actual vehicle speed "V" becomes larger. According to the above feature, it becomes possible to avoid such a situation in which the vehicle traveling speed may become excessively large, or in which the vehicle may be stopped due to an excessively small vehicle traveling speed.

(9) The target acceleration (the acceleration "as1" for the vehicle start on the sloping road) is made to be a negative figure, in the case that the actual vehicle speed "V" becomes higher than the predetermined amount. According to the above feature, it becomes possible to avoid such a situation, in which the vehicle driver may issue a command for the vehicle braking operation as a result that the actual vehicle speed "V" has reached at such a high speed during the transition period from the vehicle stopping condition to the vehicle traveling condition and thereby the vehicle driver might have an unpleasant feeling therefrom.

Second Embodiment

A second embodiment, in particular such points different from the first embodiment, will be explained with reference to the drawing.

Figure 19:
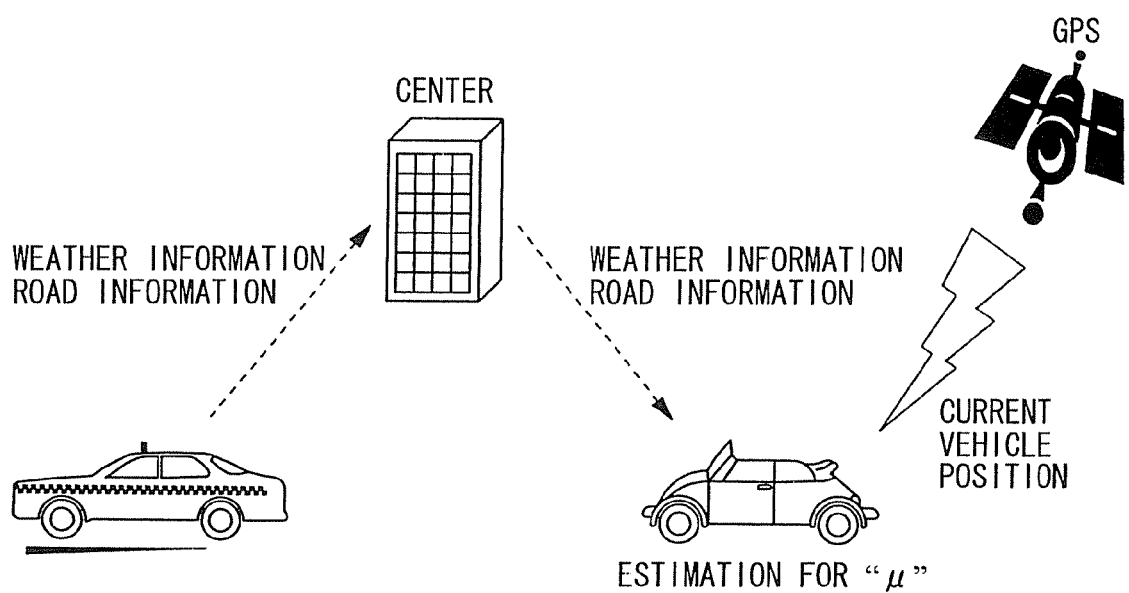
FIG. 19 a schematic system view for estimating coefficient of friction between the road surface and the vehicle wheels according to a second embodiment.

FIG. 19 shows an estimating method for the coefficient "μ" of friction between the road surface and the vehicle wheels. According to the embodiment, the coefficient "μ" of friction is estimated based on information from a vehicle navigation system, weather information, information from probe cars, and so on. An information for an area in which the vehicle is traveling can be obtained from the navigation system. An information for the current weather can be obtained from the weather information. According to such local area information and the weather information, it is possible to get an information in a snow country that it is snowing, or there remains snow cover on the roads even through it is clear sky, and so on. In addition, the coefficient "μ" of friction can be set for the snow cover roads and the acceleration "as1" for the vehicle start on the sloping road (the guard value "ag" for the upper limit) can be set based on such coefficient "μ" of friction, in the case that the vehicle is in the stopping condition and it is determined that there is snow around the vehicle.

Furthermore, since detailed information regarding the road condition can be obtained from the probe cars, which are traveling ahead of and on the roads of the present vehicle, the coefficient "μ" of friction can be estimated from such information. In the case that the information that there is snow cover on the sloping (uphill) road, or the information that the road is frozen, is obtained from the probe cars, the coefficient "μ" of friction is set (the acceleration "as1" for the vehicle start on the sloping road (the guard value "ag" for the upper limit) can be set) for such snow cover road or icy road when starting the vehicle in such an area of the probe cars. Furthermore, in the case that the information for ABS operation can be obtained from the probe cars traveling ahead, the coefficient "μ" of friction can be also estimated in a similar manner to the first embodiment.

According to the above second embodiment, the same or similar advantages to the first embodiment can be achieved.

Other Embodiments

The above embodiments may be further modified in the following manners.

(a) In the above embodiments, the acceleration "as1" for the vehicle start on the sloping road is decided based on the road gradient "θ" and the coefficient "μ" of friction. However, the acceleration "as1" may be calculated based on either one of the above parameters.

(b) A method for setting the acceleration "as1" for the vehicle start on the sloping road is not limited to such a method, in which predetermined values for respective vehicle speeds "V" and the guard value "ag" for the upper limit are compared. For example, it is possible to standardize so that a maximum amount for the acceleration "as1" for the vehicle start on the sloping road for respective vehicle speeds "V" may be set as the guard value "ag" for the upper limit.

(c) The acceleration "as1" for the vehicle start on the sloping road is not limited to such a characteristic line, according to which the acceleration is linearly decreased as the actual vehicle speed "V" is increased. It is, however, possible to avoid such a situation in which the actual vehicle speed "V" will be excessively large, so that the vehicle condition can be properly changed to the vehicle traveling condition, in the case that the acceleration is controlled to be decreased as the actual vehicle speed "V" is increased.

(d) Advantages similar to the above embodiments may be obtained, when the required power-train torque "Twpt" is controlled to become smaller as the actual acceleration "a" comes closer to the guard value "ag" for the upper limit, even in the case that the acceleration "as1" for the vehicle start on the sloping road is not calculated.

(e) A method for obtaining the information for the coefficient "μ" of friction is not limited to the methods of the above embodiments. For example, a selection switch, which has a plurality of switching positions corresponding to slippery conditions of the road, may be provided in a vehicle passenger room (eg. on an instrument panel), and any one the switching positions may be selected by the vehicle driver before starting the vehicle. According to such a modification, the coefficient "μ" of friction is in advance decided in accordance with the selection of the switching position, so that the acceleration "as1" for the vehicle start on the sloping road can be calculated. In such a case, an additional switch may be provided to select a winter mode and a summer mode in order to increase convenience for a vehicle user in the snow country. Furthermore, a relationship between the switching positions and the guard value "ag" of the upper limit for the acceleration "as1" for the vehicle start on the sloping road may be in advance decided. In such a case, the calculation for the guard value "ag" of the upper limit can be omitted.

(f) According to the above embodiments, the operation for the vehicle start control on the uphill road is terminated, when the vehicle speed "V" becomes zero after the vehicle speed "V" has once become larger than the predetermined speed, or when the manually required acceleration torque becomes larger than the electronically required power-train torque "Twpt". However, in addition to the above conditions, the operation for the vehicle start control on the uphill road may be terminated, when a predetermined time has passed since the operation for the vehicle start control on the uphill road is started.

(g) According to the above embodiments, the brake pedal releasing operation by the vehicle driver when the vehicle is on the sloping road is regarded as a condition for starting the operation for the vehicle start control on the uphill road. However, a switch for indicating the automatic vehicle start may be provided in the vehicle passenger room (eg. the an instrument panel). When such a switch is turned on, and when the brake pedal is operated in its releasing direction by a predetermined amount, the condition for starting the operation for the vehicle start control on the uphill road can be regarded as being satisfied.

(h) It is also advantageous to carry out the operation for the vehicle start control of the invention so as to automatically bring the vehicle condition to the vehicle traveling condition, not only when the vehicle is on the sloping road but also when the vehicle is on a flat road (the road gradient is zero), in order to avoid the wheel slips.

(i) According to the above embodiments, the normative model is set based on the response characteristic, which has the largest response delay between the stepwise change of the target acceleration and the actual acceleration. The normative model may be changed depending on the response characteristic of each operating condition of the vehicle. Furthermore, the normative model may not be limited to the primary-delay model, but can be made as a secondary-delay model.

(j) The feed-back control portion B24 may not be limited to PID control. For example, any one of or any two of the P-control, I-control and D-control may be applied to the feed-back control. Furthermore, a modern control may be used instead of a classic control.

(k) The process of the feed-forward control portion B26 is not limited to that explained in the above embodiment. For example, the feed-forward operating amount "Tff" may be calculated based on only the normative force "Maj". In addition, the feed-forward operating amount "Tff" may be calculated based on not only the above normative force "Maj" but also one or two of the air resistance, road resistance, and the force of gravity. It is preferable to calculate the feed-forward operating amount "Tff" based on at least the force of gravity, in order that the vehicle is prevented from moving in the opposite direction to the vehicle traveling direction during the operation of the vehicle start control on the uphill road.

(l) In the above embodiment, the control of two-degree-of-freedom is used. However, the feed-back control of the PID control may be also applied to the above embodiment.

(m) In the above embodiment, the control for following the model is used. However, the control having no normative model setting portion B14 may be also used.

(n) In the above embodiment, the power-train system having the engine 10 and the automatic transmission apparatus 14 is explained as a power generating device, which applies a positive torque to the vehicle (more exactly, to the driving wheels 16) in case of acceleration control operation. However, an electric motor may be used as the power generating device (power-train system).

(o) In the above embodiment, the hydraulically operated brake actuator 20 is used as a means for applying a negative torque to the vehicle (more exactly, to the driving wheels 16) in case of acceleration control operation. An electrically operated brake device, such as a device disclosed in Japanese Patent Publication No. 2004-75055, may be used. Furthermore, an electric generating machine may be also used for converting rotational force of the vehicle wheels (the driving wheels 16 and the driven wheels 18) into electrical energy.

(p) In the above embodiment, the target acceleration is set in order to automatically bring the vehicle condition from its stopping condition to its traveling condition. However, it may be modified in such a way that the target torque is set but the target acceleration is not set. In such a modification, the torque to be applied to the driving wheels 16 may be reduced as the road gradient becomes larger or the coefficient of friction between the wheels and the road surface becomes smaller. As a result, the wheel slips can be properly avoided.

What is claimed is:

1. A vehicle control system comprising:
   an information obtaining means for obtaining road information around a vehicle; and
   an automatic vehicle traveling means for operating a power generating means mounted in the vehicle based on the road information in order to bring the vehicle from vehicle stopping condition to vehicle traveling condition, when a demand for changing the vehicle condition from the stopping condition to the traveling condition is generated,
   wherein the road information includes information relating to a road gradient around the vehicle and information relating to a friction between vehicle wheels and road surface around the vehicle,
   wherein the automatic vehicle traveling means makes vehicle acceleration smaller as the road gradient becomes larger during an operation for changing the vehicle condition to the vehicle traveling condition, when the vehicle is on a sloping road and the vehicle is traveling in a direction opposite to a direction of a force of gravity applied to the vehicle, and
   wherein the automatic vehicle traveling means makes vehicle acceleration smaller, as frictional force between the vehicle wheels and the road surface becomes smaller during the operation for changing the vehicle condition to the vehicle traveling condition.

2. The vehicle control system according to the claim 1, wherein
   the automatic vehicle traveling means automatically changes the vehicle condition from the stopping condition to the traveling condition, wherein the automatic vehicle traveling means limits torque generated by the power generating means to such a range, in which slip may not occur at vehicle wheels, based on the road information.

3. The vehicle control system according to the claim 1, wherein
   the automatic vehicle traveling means comprises;
   an upper limit setting portion for setting an upper limit ("ag") for vehicle acceleration based on the road information; and
   an acceleration control portion for controlling actual vehicle acceleration to be lower than the upper limit.

4. The vehicle control system according to the claim 3, wherein
   the acceleration control portion comprises;
   an acceleration setting portion for setting a target acceleration, which is lower than the upper limit; and
   an operating portion for operating the power generating means so that the actual vehicle acceleration is controlled at the target acceleration.

5. The vehicle control system according to the claim 4, wherein
   the acceleration setting portion sets the target acceleration based on vehicle speed.

6. The vehicle control system according to the claim 5, wherein the acceleration setting portion sets the target acceleration at a smaller value, as the vehicle speed becomes larger.

7. The vehicle control system according to the claim 6, wherein
the acceleration setting portion sets the target acceleration as a negative figure, when the vehicle speed becomes larger than a predetermined speed.

8. The vehicle control system according to the claim 1, wherein
the automatic vehicle traveling means automatically changes the vehicle from the vehicle stopping condition to the vehicle traveling condition, in the case the automatic vehicle traveling means determines based on the road information that vehicle traveling direction is opposite to a direction of the force of gravity.

9. The vehicle control system according to the claim 1, wherein the automatic vehicle traveling means operates the power generating means to generate and increase an impelling force which will be applied to the vehicle in the vehicle traveling direction,
wherein the automatic vehicle traveling means further operates a vehicle braking device to generate a braking force to be applied to the vehicle and to decrease the braking force depending on an increase of the impelling force, so that the braking force is made to be zero when the impelling force becomes larger than a component of the force of gravity applied to the vehicle in a direction opposite to the vehicle traveling direction,
wherein the automatic vehicle traveling means operates the power generating means and the vehicle braking device, in such a manner that resultant force of the impelling force and the braking force becomes larger than the component of the force of gravity,
wherein the above operation is carried out by the automatic vehicle traveling means when the automatic vehicle traveling means determines that the vehicle traveling direction is opposite to the direction of the force of gravity, and
wherein the above operation is carried out by the automatic vehicle traveling means until the vehicle condition is changed to the vehicle traveling condition.

10. A vehicle control system comprising:
an electronic control unit for receiving various vehicle information relating to a road condition and a vehicle traveling condition, the vehicle information including at least a road gradient and a vehicle speed,
wherein the electronic control unit has a vehicle start control portion, which calculates a target vehicle acceleration based on the vehicle information including the road gradient, when the vehicle is to be started on an uphill road,
wherein the electronic control unit calculates, based on the target acceleration, a required engine torque, a required gear ratio and a required brake pressure, so that an engine is operated to generate the required engine torque, a transmission apparatus is operated with the required gear ratio, and hydraulic brake pressure is controlled at the required brake pressure, in order that vehicle acceleration is controlled at the target acceleration during an operation for changing a vehicle condition from a vehicle stopping condition to a vehicle traveling condition, and
wherein the target acceleration is limited to such a value, within which slip may not occur between vehicle wheels and a road surface,
wherein the target acceleration is controlled to become smaller as the road gradient becomes larger during the operation for changing the vehicle condition to the vehicle traveling condition, when the vehicle is on a sloping road and the vehicle is traveling in a direction opposite to a direction of a force of gravity applied to the vehicle and
wherein the target acceleration is controlled to become smaller, as frictional force between the vehicle wheels and the road surface becomes smaller during the operation for changing the vehicle condition to the vehicle traveling condition.

11. The vehicle control system according to the claim 10, wherein
the electronic control unit comprises;
an upper limit setting portion for setting an upper limit ("ag") for the target acceleration based on the road information; and
an acceleration control portion for controlling actual vehicle acceleration to be lower than the upper limit.

12. A vehicle control system comprising:
an information obtaining means for obtaining road information around a vehicle; and
an automatic vehicle traveling means for operating a power generating means mounted in the vehicle based on the road information in order to bring the vehicle from vehicle stopping condition to vehicle traveling condition, when a demand for changing the vehicle condition from the stopping condition to the traveling condition is generated,
wherein the road information includes information relating to a road gradient around the vehicle and information relating to a friction between vehicle wheels and road surface around the vehicle,
wherein the automatic vehicle traveling means makes torque to be generated by the power generating means and applied to vehicle driving wheels smaller, as the road gradient becomes larger during an operation for changing the vehicle condition to the vehicle traveling condition, when the vehicle is on a sloping road and the vehicle is traveling in a direction opposite to a direction of a force of gravity applied to the vehicle, and
wherein the automatic vehicle traveling means makes torque to be generated by the power generating means and applied to vehicle driving wheels smaller, as frictional force between the vehicle wheels and the road surface becomes smaller during the operation for changing the vehicle condition to the vehicle traveling condition.

13. The vehicle control system according to the claim 12, wherein
the automatic vehicle traveling means comprises;
an upper limit setting portion for setting an upper limit ("ag") for vehicle acceleration based on the road information; and
an acceleration control portion for controlling actual vehicle acceleration to be lower than the upper limit.

14. The vehicle control system according to the claim 13, wherein
the acceleration control portion comprises;
an acceleration setting portion for setting a target acceleration, which is lower than the upper limit; and
an operating portion for operating the power generating means so that the actual vehicle acceleration is controlled at the target acceleration.

15. The vehicle control system according to the claim 14, wherein
the acceleration setting portion sets the target acceleration based on vehicle speed.

16. The vehicle control system according to the claim 15, wherein
the acceleration setting portion sets the target acceleration at a smaller value, as the vehicle speed becomes larger.

17. The vehicle control system according to the claim 16, wherein
the acceleration setting portion sets the target acceleration as a negative figure, when the vehicle speed becomes larger than a predetermined speed.

18. The vehicle control system according to the claim 12, wherein
the automatic vehicle traveling means automatically changes the vehicle from the vehicle stopping condition to the vehicle traveling condition, in the case the automatic vehicle traveling means determines based on the road information that vehicle traveling direction is opposite to a direction of the force of gravity.

19. The vehicle control system according to the claim 12, wherein
the automatic vehicle traveling means operates the power generating means and a vehicle braking device, in such a manner that resultant force of an impelling force generated by the power generating means and applied to the vehicle in the vehicle traveling direction and a braking force generated by the vehicle braking device and applied to the vehicle becomes larger than a component of the force of gravity applied to the vehicle in a direction opposite to the vehicle traveling direction,
wherein the above operation is carried out by the automatic vehicle traveling means when the automatic vehicle traveling means determines that the vehicle traveling direction is opposite to the direction of the force of gravity, and
wherein the above operation is carried out by the automatic vehicle traveling means until the vehicle condition is changed to the vehicle traveling condition.

20. The vehicle control system according to the claim 12, wherein the automatic vehicle traveling means operates the power generating means to generate and increase an impelling force which will be applied to the vehicle in the vehicle traveling direction,
wherein the automatic vehicle traveling means further operates a vehicle braking device to generate a braking force to be applied to the vehicle and to decrease the braking force depending on an increase of the impelling force, so that the braking force is made to be zero when the impelling force becomes larger than a component of the force of gravity applied to the vehicle in a direction opposite to the vehicle traveling direction,
wherein the automatic vehicle traveling means operates the power generating means and the vehicle braking device, in such a manner that resultant force of the impelling force and the braking force becomes larger than the component of the force of gravity,
wherein the above operation is carried out by the automatic vehicle traveling means when the automatic vehicle traveling means determines that the vehicle traveling direction is opposite to the direction of the force of gravity, and
wherein the above operation is carried out by the automatic vehicle traveling means until the vehicle condition is changed to the vehicle traveling condition.

21. The vehicle control system according to the claim 20, wherein
the electronic control unit comprises;
an upper limit setting portion for setting an upper limit ("ag") for the target acceleration based on the road information; and
an acceleration control portion for controlling actual vehicle acceleration to be lower than the upper limit.

22. A vehicle control system comprising:
an electronic control unit for receiving various vehicle information relating to a road condition and a vehicle traveling condition, the vehicle information including at least a road gradient and a vehicle speed,
wherein the electronic control unit has a vehicle start control portion, which calculates a target vehicle acceleration based on the vehicle information including the road gradient, when the vehicle is to be started on an uphill road,
wherein the electronic control unit calculates, based on the target acceleration, a required engine torque, a required gear ratio and a required brake pressure, so that an engine is operated to generate the required engine torque, a transmission apparatus is operated with the required gear ratio, and hydraulic brake pressure is controlled at the required brake pressure, in order that vehicle acceleration is controlled at the target acceleration during an operation for changing a vehicle condition from a vehicle stopping condition to a vehicle traveling condition, and
wherein the target acceleration is limited to such a value, within which slip may not occur between vehicle wheels and a road surface,
wherein the engine and the transmission apparatus form a power generating unit,
a torque to be generated by the power generating unit and applied to vehicle driving wheels is controlled to become smaller, as the road gradient becomes larger during the operation for changing the vehicle condition to the vehicle traveling condition, when the vehicle is on a sloping road and the vehicle is traveling in a direction opposite to a direction of a force of gravity applied to the vehicle, and
the above torque to be generated by the power generating unit and applied to the vehicle driving wheels is further controlled to become smaller, as frictional force between the vehicle wheels and the road surface becomes smaller during the operation for changing the vehicle condition to the vehicle traveling condition.

* * * * *